US012650699B2

(12) United States Patent
Huang et al.

(10) Patent No.: US 12,650,699 B2
(45) Date of Patent: Jun. 9, 2026

(54) SMART SNOW REMOVAL METHOD, SNOW REMOVAL ROBOT AND SMART SNOW REMOVAL EQUIPMENT

(71) Applicant: SHENZHEN HANYANG TECHNOLOGY CO., LTD., Shenzhen (CN)

(72) Inventors: Yang Huang, Shenzhen (CN); Jialai Li, Shenzhen (CN)

(73) Assignee: SHENZHEN HANYANG TECHNOLOGY CO., LTD., Shenzhen (CN)

( * ) Notice: Subject to any disclaimer, the term of this patent is extended or adjusted under 35 U.S.C. 154(b) by 439 days.

(21) Appl. No.: 18/523,797

(22) Filed: Nov. 29, 2023

(65) Prior Publication Data

US 2024/0219926 A1     Jul. 4, 2024

Related U.S. Application Data

(63) Continuation-in-part of application No. PCT/CN2022/143005, filed on Dec. 28, 2022.

(51) Int. Cl.
E01H 5/09         (2006.01)
E01H 5/04         (2006.01)
(Continued)

(52) U.S. Cl.
CPC ........... G05D 1/6482 (2024.01); E01H 5/045 (2013.01); E01H 5/098 (2013.01); G05D 1/2464 (2024.01);
(Continued)

(58) Field of Classification Search
CPC ...... G05D 1/242; G05D 1/2464; G05D 1/248; G05D 1/622; G05D 1/633; G05D 1/648;
(Continued)

(56) References Cited

U.S. PATENT DOCUMENTS

| | | | |
|---|---|---|---|
| 5,177,685 A | * | 1/1993 | Davis ................. B60R 16/0373 |
| | | | 340/988 |
| 9,241,442 B2 | * | 1/2016 | Diazdelcastillo .... G05D 1/0265 |

(Continued)

FOREIGN PATENT DOCUMENTS

| | | |
|---|---|---|
| CN | 105320133 A | 2/2016 |
| CN | 106592499 A | 4/2017 |

(Continued)

OTHER PUBLICATIONS

WIPO, International Search Report for PCT Application No. PCT/CN2022/143005, Jun. 14, 2023.

*Primary Examiner* — Tyler J Lee

(57) ABSTRACT

Provided are a smart snow removal method and equipment, and a snow removal robot. Based on GPS-RTK localization technology, latitude and longitude coordinates of a target snow throwing area and a target snow removal area are acquired, and a snow removal map is generated. Grid processing is performed on the snow removal map. Potential-field processing is performed on the snow removal map by: taking a grid located in the target snow throwing area as a starting point, and assigning, based on a breadth-first search algorithm, to grids located in the target snow removal area potential energy values in a manner of spreading outward. The snow removal robot is controlled to travel grid by grid from an uncleared grid whose potential energy value is currently the largest, and the snow removal operation is performed on an arrived grid, until the snow removal robot travels to the target snow throwing area.

20 Claims, 9 Drawing Sheets

(51) Int. Cl.

| | |
|---|---|
| *E01H 5/08* | (2006.01) |
| *G05D 1/24* | (2024.01) |
| *G05D 1/246* | (2024.01) |
| *G05D 1/248* | (2024.01) |
| *G05D 1/633* | (2024.01) |
| *G05D 1/648* | (2024.01) |
| *G05D 105/00* | (2024.01) |

(52) U.S. Cl.
CPC ............. *G05D 1/248* (2024.01); *G05D 1/633* (2024.01); *E01H 5/08* (2013.01); *G05D 2105/12* (2024.01)

(58) Field of Classification Search
CPC ........ G05D 1/6482; E01H 5/045; E01H 5/08; E01H 5/098
See application file for complete search history.

(56) References Cited

U.S. PATENT DOCUMENTS

| | | | | |
|---|---|---|---|---|
| 9,363,945 | B2 * | 6/2016 | Jägenstedt | ........... G05D 1/0265 |
| 10,280,576 | B1 * | 5/2019 | Osorio | .................... E01H 5/106 |
| 10,920,386 | B2 * | 2/2021 | Gao | ......................... E01H 5/098 |
| 11,348,269 | B1 * | 5/2022 | Ebrahimi Afrouzi | ... G01S 17/48 |
| 11,352,757 | B2 * | 6/2022 | Gao | ......................... E01H 5/098 |
| 11,481,918 | B1 * | 10/2022 | Ebrahimi Afrouzi | ....................... A47L 11/4008 |
| 11,657,531 | B1 * | 5/2023 | Ebrahimi Afrouzi | .. G06V 10/44 382/284 |
| 11,846,078 | B2 * | 12/2023 | Johnson | .................... E01H 5/09 |
| 11,993,284 | B2 * | 5/2024 | Lacaze | .................... G05D 1/695 |
| 11,993,904 | B2 * | 5/2024 | Gao | ......................... E01H 5/098 |
| 12,185,663 | B2 * | 1/2025 | Juel | ....................... G05D 1/0278 |
| 12,409,869 | B2 * | 9/2025 | Tschinkel | ............... B61B 11/00 |
| 2014/0180478 | A1 * | 6/2014 | Letsky | ..................... E01H 5/00 700/258 |
| 2014/0278052 | A1 * | 9/2014 | Slavin | ............... G01C 21/3492 701/400 |
| 2016/0244925 | A1 * | 8/2016 | Yuki | ....................... E01H 5/045 |
| 2017/0268441 | A1 * | 9/2017 | Yamazaki | ............ F02D 41/021 |
| 2019/0003137 | A1 * | 1/2019 | Gao | ......................... E01H 5/098 |
| 2019/0120640 | A1 * | 4/2019 | Ho | ..................... G01C 21/3453 |
| 2019/0357431 | A1 * | 11/2019 | Kamfors | ............. G05D 1/0214 |
| 2020/0392684 | A1 * | 12/2020 | Gao | ......................... E01H 5/098 |
| 2021/0364632 | A1 * | 11/2021 | Sagalovich | ........... G06V 20/58 |
| 2022/0035320 | A1 * | 2/2022 | Tschinkel | ............... B61B 11/00 |
| 2022/0066456 | A1 * | 3/2022 | Ebrahimi Afrouzi | ....................... G06F 3/04883 |
| 2022/0124973 | A1 * | 4/2022 | Juel | ...................... A01D 34/008 |
| 2022/0282440 | A1 * | 9/2022 | Gao | ......................... E01H 5/098 |
| 2024/0117598 | A1 * | 4/2024 | Kotlaba | ................. E02F 9/264 |
| 2024/0287749 | A1 * | 8/2024 | Gao | ......................... E01H 5/098 |

FOREIGN PATENT DOCUMENTS

| | | |
|---|---|---|
| CN | 109958089 A | 7/2019 |
| CN | 110512671 A | 11/2019 |
| CN | 111158365 A | 5/2020 |
| CN | 218116295 U | 12/2022 |

* cited by examiner

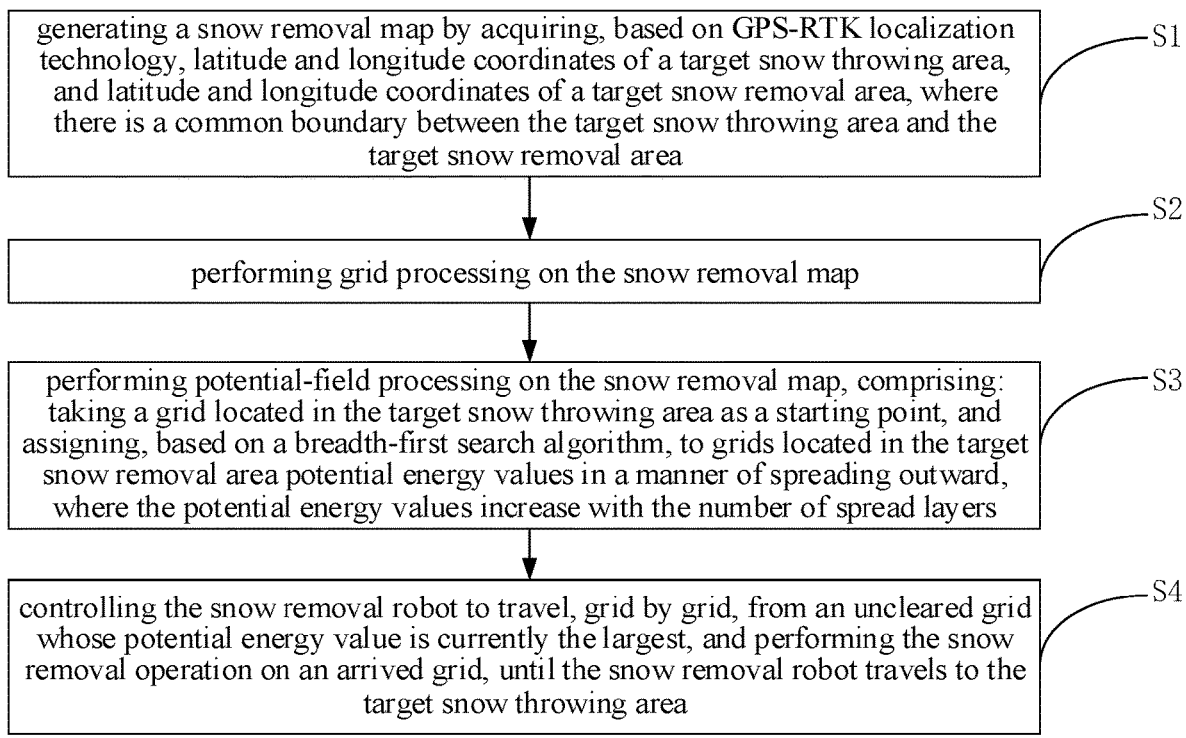

generating a snow removal map by acquiring, based on GPS-RTK localization technology, latitude and longitude coordinates of a target snow throwing area, and latitude and longitude coordinates of a target snow removal area, where there is a common boundary between the target snow throwing area and the target snow removal area ⟶S1 performing grid processing on the snow removal map ⟶S2 performing potential-field processing on the snow removal map, comprising: taking a grid located in the target snow throwing area as a starting point, and assigning, based on a breadth-first search algorithm, to grids located in the target snow removal area potential energy values in a manner of spreading outward, where the potential energy values increase with the number of spread layers ⟶S3 controlling the snow removal robot to travel, grid by grid, from an uncleared grid whose potential energy value is currently the largest, and performing the snow removal operation on an arrived grid, until the snow removal robot travels to the target snow throwing area ⟶S4

FIG. 1 snow throwing grid

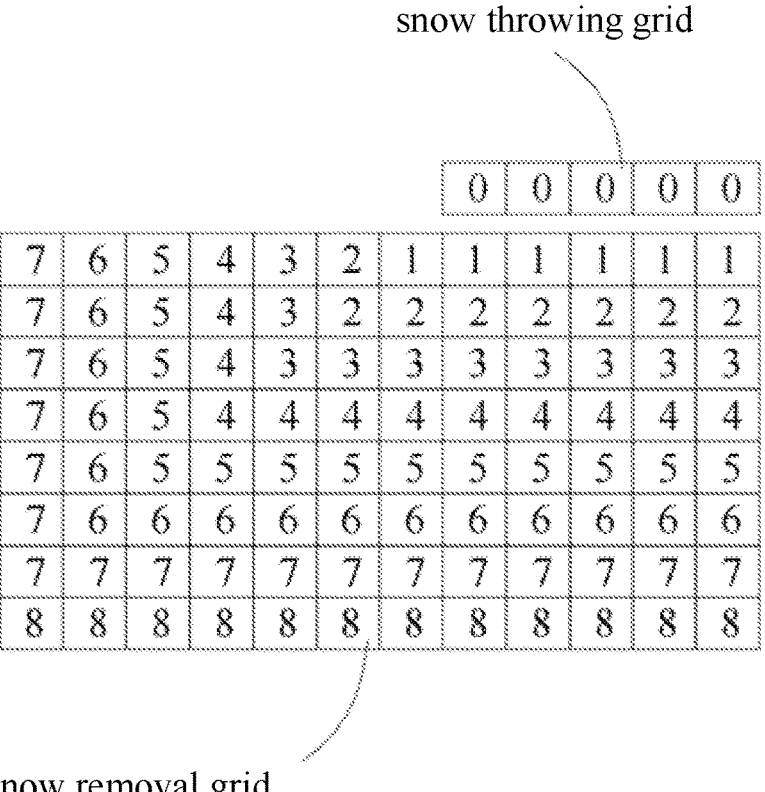

snow removal grid

FIG. 2 snow throwing grid snow removal grid static obstacle grid snow throwing grid static obstacle grid  snow removal grid snow throwing grid snow throwing grid snow removal grid snow throwing grid snow throwing grid snow removal grid snow removal area grid snow removal area regulation reference segment actual snow
throwing grid grid where the
snow removal robot
is currently located

SMART SNOW REMOVAL METHOD, SNOW REMOVAL ROBOT AND SMART SNOW REMOVAL EQUIPMENT

CROSS-REFERENCE OF RELATED APPLICATIONS

This application is a continuation-in-part of International Application PCT/CN2022/143005 filed Dec. 28, 2022, which is herein incorporated by reference in its entirety.

TECHNICAL FIELD

The disclosure relates to the field of snow removal equipment (also referred to as snow cleaning/sweeping equipment), and particularly to a smart snow removal method, a snow removal robot, and smart snow removal equipment.

BACKGROUND

In the existing automatic snow removal vehicles, the localization thereof is generally realized through ultra-wide band (UWB) tag wireless carrier communication. In this way, the snow removal vehicle cannot be driven to clear multiple areas at one time, resulting in low efficiency in snow removal.

SUMMARY

The embodiments of the disclosure provide a smart snow removal method. The snow removal robot includes:

generating a snow removal map by acquiring, based on GPS-RTK localization technology, latitude and longitude coordinates of a target snow throwing area, and latitude and longitude coordinates of a target snow removal area, where there is a common boundary between the target snow throwing area and the target snow removal area;

performing grid processing on the snow removal map;

performing potential-field processing on the snow removal map obtained through the grid processing, including: taking a grid located in the target snow throwing area as a starting point, and assigning, based on a breadth-first search algorithm, to grids located in the target snow removal area potential energy values in a manner of spreading outward, where the potential energy values increase with the number of spread layers; and controlling the snow removal robot to travel, grid by grid, from an uncleared grid whose potential energy value is currently the largest, and performing a snow removal operation on an arrived grid, until the snow removal robot travels to the target snow throwing area.

The embodiments of the disclosure further provide a snow removal robot. The snow removal robot includes:

a traveling assembly, configured to travel along a planned path, where the planned path is determined by:

generating a snow removal map by acquiring, based on GPS-RTK localization technology, latitude and longitude coordinates of a target snow throwing area, and latitude and longitude coordinates of a target snow removal area, where there is a common boundary between the target snow throwing area and the target snow removal area;

obtaining girds of the snow removal map by performing grid processing on the snow removal map;

taking a grid located in the target snow throwing area as a starting point, and assigning, based on a breadth-first search algorithm, to grids located in the target snow removal area potential energy values in a manner of spreading outward, where the potential energy values increase with the number of spread layers; and determining, based on the potential energy values of the grids located in the target snow removal area, a planned path for travelling grid by grid;

a snow feeding assembly provided on the traveling assembly, where the snow feeding assembly is configured to collect snow on each arrived grid during a snow removal operation; and a snow throwing assembly provided on the traveling assembly and connected with the snow feeding assembly, where the snow throwing assembly is configured to throw the snow collected by the snow feeding assembly to a predetermined area during the snow removal operation.

The embodiments of the disclosure further provide a smart snow removal equipment. The smart snow removal equipment includes a memory, configured to store at least one instruction or at least one program;

a controller connected with the memory, wherein the controller is configured to perform the at least one instruction or at least one program to:

generate, based on GPS-RTK localization technology, a snow removal map of a target snow throwing area and a target snow removal area which have a common boundary;

obtain, based on grid processing, grids of the snow removal map;

take a grid located in the target snow throwing area as a starting point, and assign, based on a breadth-first search algorithm, to grids located in the target snow removal area potential energy values in a manner of spreading outward, wherein the potential energy values increase with the number of spread layers; and determine, based on the potential energy values of the grids located in the target snow removal area, a planned path for travelling grid by grid;

a traveling assembly connected with the controller, wherein the traveling assembly is configured to travel, grid by grid, along the planned path from an uncleared grid whose potential energy value is currently the largest, until the traveling assembly; and a snow removal assembly connected with the controller and the travelling assembly, wherein the snow removal assembly is configured to perform, under control of the controller, a snow removal operation on each grid where the traveling assembly arrives.

BRIEF DESCRIPTION OF THE DRAWINGS

FIG. 1 is a schematic flowchart of a snow removal method according to some embodiments of the disclosure.

FIG. 2 is a first schematic diagram illustrating potential field values of grids in the snow removal method according to some embodiments of the disclosure.

DETAILED DESCRIPTION OF PREFERRED EMBODIMENTS

Figure 3:
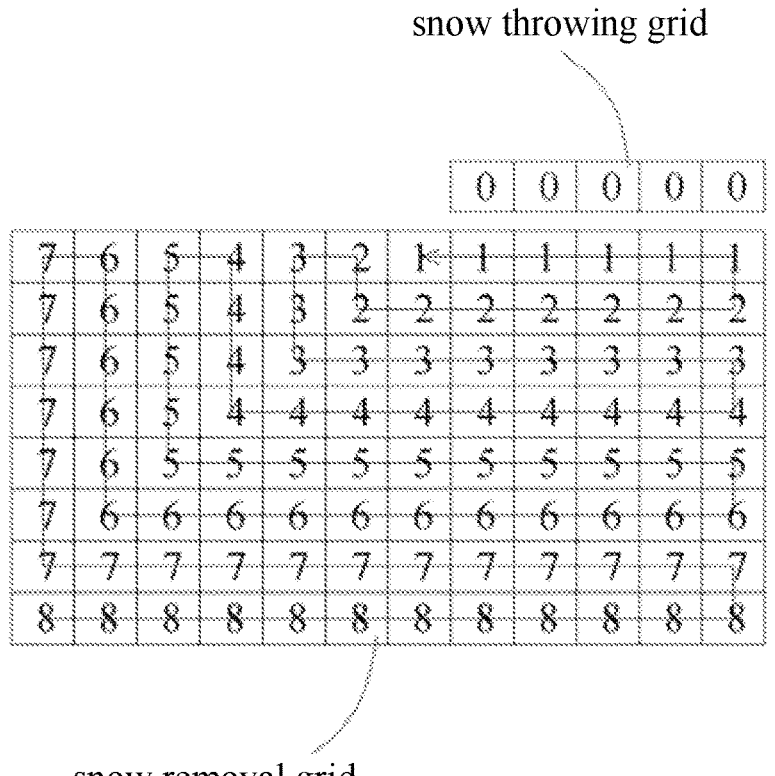
FIG. 3 is a schematic diagram illustrating a first path planning for a snow removal robot in the snow removal method according to some embodiments of the disclosure.

The existing automatic snow removal vehicle cannot clear multiple areas at one time, thereby having a technical problem of low efficiency in snow removal.

A main objective of the disclosure is to provide a smart snow removal method, which intends to solve the technical problem of low efficiency of snow removal caused by a fact that the above-mentioned automatic snow removal vehicle cannot clear multiple areas at one time.

In order to achieve the objective, the embodiments of the disclosure provide a smart snow removal method, which is implemented by a snow removal robot. The snow removal robot includes:

a traveling assembly, configured to travel along a planned path;

a snow feeding assembly provided on the traveling assembly, where the snow feeding assembly is configured to collect snow during a snow removal operation; and a snow throwing assembly provided on the traveling assembly and connected with the snow feeding assembly, where the snow throwing assembly is configured to throw the snow collected by the snow feeding assembly to a predetermined area during the snow removal operation;

the smart snow removal method includes:

generating a snow removal map by acquiring, based on GPS-RTK (global positioning system, real-time kinematic, localization technology, latitude and longitude coordinates of a target snow throwing area, and latitude and longitude coordinates of a target snow removal area, where there is a common boundary between the target snow throwing area and the target snow removal area;

performing grid processing on the snow removal map;

performing potential-field processing on the snow removal map obtained through the grid processing, including: taking a grid located in the target snow throwing area as a starting point, and assigning, based on a breadth-first search algorithm, to grids located in the target snow removal area potential energy values in a manner of spreading outward, where the potential energy values increase with the number of spread layers; and controlling the snow removal robot to travel, grid by grid, from an uncleared grid whose potential energy value is currently the largest, and performing the snow removal operation (snow cleaning/sweeping operation) on an arrived grid, until the snow removal robot travels to the target snow throwing area.

Furthermore, after the performing grid processing on the snow removal map, the method further includes:

determining whether each grid is located in the target snow removal area based on an angle method, including: for each of the grids, taking connecting lines respectively between a central point of the grid and individual vertices of the target snow removal area as first auxiliary lines, and determining whether a sum of included angles between adjacent ones of all the first auxiliary lines is equal to 360°; and in response to the sum of the included angles between adjacent ones of all the first auxiliary lines being equal to 360°, determining that the grid is located in the target snow removal area; and setting each grid located in the target snow removal area as a snow removal grid, and setting each grid located in the target snow throwing area as a snow throwing grid; and where the taking a grid located in the target snow throwing area as a starting point, assigning, based on a breadth-first search algorithm, to grids located in the target snow removal area potential energy values in a manner of spreading outward, includes:

taking the snow throwing grid as the starting point, and assigning, based on the breadth-first search algorithm, the potential energy values to all the snow removal grids in the manner of spreading outward.

Furthermore, the generating a snow removal map by acquiring, based on GPS-RTK localization technology, latitude and longitude coordinates of a target snow throwing area, and latitude and longitude coordinates of a target snow removal area, includes:

generating a snow removal map by acquiring, based on the GPS-RTK localization technology, the latitude and longitude coordinates of the target snow throwing area, the latitude and longitude coordinates of the target snow removal area, and latitude and longitude coordinates of a static obstacle area;

after the performing grid processing on the snow removal map, the method further includes:

determining, based on an angle method, whether each grid overlaps with the static obstacle area, including: comprising: for each of the grids, taking connecting lines respectively between each grid vertex of the grid and individual vertices of the static obstacle area as second auxiliary lines, and determining, for each grid vertex of the grid, whether a sum of included angles between adjacent ones of all the second auxiliary lines corresponding to the grid vertex is equal to 360°; and in response to the sum of the included angles between adjacent ones of all the second auxiliary lines corresponding to any grid vertex of a grid is equal to 360°, determining that this grid overlaps with the static obstacle area; and setting each grid overlapping with the static obstacle area as a static obstacle grid; and before the taking the snow throwing grid as the starting point, and assigning, based on the breadth-first search algorithm, the potential energy values to the snow removal grids in the manner of spreading outward, the method further includes:

determining whether the snow removal grids include the static obstacle grid; and in response to the snow removal grids comprising the static obstacle grid, excluding the static obstacle grid from the snow removal grids.

Furthermore, the for each of the grids, taking connecting lines respectively between a central point of the grid and individual vertices of the target snow removal area as first auxiliary lines, and determining whether a sum of included angles between adjacent ones of all the first auxiliary lines is equal to 360°, includes:

determining whether the central point satisfies the following formula:

$$\sum_{i \in P, j=i+1(next)} \sin^{-1}\left(\frac{\overrightarrow{OP_i} \times \overrightarrow{OP_j}}{|\overrightarrow{OP_i}| * |\overrightarrow{OP_j}|}\right) = 2k\pi(k \in Z)$$

where O represents coordinates of the central point, $P_i$ and $P_j$ represent coordinates of two adjacent vertices of the target snow removal area, superscripts of $\overrightarrow{OP_i}$ and $\overrightarrow{OP_j}$ represent vector symbols, and Z represents a set of integers;

in response to the formula being satisfied, determining that the included sum of the included angles between adjacent ones of all the first auxiliary lines is equal to 360°.

Furthermore, the for each of the grids, taking connecting lines respectively between each grid vertex of the grid and individual vertices of the static obstacle area as second auxiliary lines, and determining, for each grid vertex of the grid, whether a sum of included angles between adjacent ones of all the second auxiliary lines corresponding to the grid vertex is equal to 360°, includes:

determining whether the grid vertex of the grid satisfies the following formula:

$$\sum_{i \in P, j=i+1(next)} \sin^{-1}\left(\frac{\overrightarrow{DP_i} \times \overrightarrow{DP_j}}{|\overrightarrow{DP_i}| * |\overrightarrow{DP_j}|}\right) = 2k\pi(k \in Z)$$

where D represents coordinates of the grid vertex of the grid, $P_i$ and $P_j$ represent coordinates of two adjacent vertices of the static obstacle area, superscripts of $\overrightarrow{DP_i}$ and $\overrightarrow{DP_j}$ represent vector symbols, and Z represents a set of integers;

in response to the formula being satisfied, determining that the sum of the included angles between adjacent ones of all the second auxiliary lines corresponding to the grid vertex of the grid is equal to 360°.

Furthermore, the controlling the snow removal robot to travel, grid by grid, from an uncleared grid whose potential energy value is currently the largest, and performing the snow removal operation on an arrived grid, includes:

in response to the snow removal robot completing the snow removal operation on a snow removal grid where the snow removal is currently located, searching, in a preset range with the snow removal robot as a center, for a first target snow removal grid whose potential energy value is greater than or equal to a potential energy value of a grid where the snow removal robot is currently located, where the first target snow removal grid is in an uncleared state;

in response to searching out, in the preset range, at least one first target snow removal grid whose potential energy value is greater than or equal to the potential energy value of the grid where the snow removal robot is currently located, controlling the snow removal robot to travel, along the snow removal grids, to a nearest first target snow removal grid, and performing the snow removal operation on the first target snow removal grid;

in response to searching out, in the preset range, no first target snow removal grid whose potential energy value is greater than or equal to the potential energy value of the grid where the snow removal robot is currently located, searching, in the preset range with the snow removal robot as the center, for a second target snow removal grid whose potential energy value is less than the potential energy value of the grid where the snow removal robot is currently located, where the second target snow removal grid is in the uncleared state; and in response to searching out, in the preset range, at least one second target snow removal grid whose potential energy value is less than the potential energy value of the grid where the snow removal robot is currently located, controlling the snow removal robot to travel, along the snow removal grids, to a nearest second target snow removal grid, and performing the snow removal operation on the second target snow removal grid.

Furthermore, after the searching, in the preset range with the snow removal robot as the center, for a second target snow removal grid whose potential energy value is less than the potential energy value of the grid where the snow removal robot is currently located, the method further includes:

in response to searching out, in the preset range, no second target snow removal grid whose potential energy value is less than the potential energy value of the grid where the snow removal robot is currently located, searching for the snow throwing grid in the preset range with the snow removal robot as the center;

in response to searching out the snow throwing grid in the preset range, searching for third target snow removal grid that is uncleared in the snow removal map;

in response to searching out at least one third target snow removal grid in the snow removal map, controlling, based on a D*Lite algorithm, the snow removal robot to travel, along the snow removal grids, to a third target snow removal grid whose potential energy value is currently the largest, and performing the snow removal operation on the third target snow removal grid; and in response to the snow removal robot completing the snow removal operation on the third target snow removal grid, proceeding to the operation of searching, in a preset range with the snow removal robot as a center, for a first target snow removal grid whose potential energy value is greater than or equal to the potential energy value of the grid where the snow removal robot is currently located.

Furthermore, the performing the snow removal operation on an arrived grid, includes:

collecting snow by the snow feeding assembly;

determining whether there is a snow throwing grid in a preset range;

in response to no snow throwing grid being in the preset range, taking, as an actual snow throwing grid, an uncleared snow removal grid whose potential energy value is the lowest in the preset range;

in response to a snow throwing grid being in the preset range, taking the snow throwing grid as the actual snow throwing grid; and orienting a snow throwing direction of the snow throwing assembly toward the actual snow throwing grid.

The method further includes: setting a mark indicating the uncleared state, on each snow throwing grid and each snow removal gird for which the snow removal robot has not performed the snow removal operation; and setting a mark indicating a cleared stated, on each snow removal grid for which the snow removal robot has been performed the snow removal operation.

Furthermore, the traveling assembly is provided with a millimeter-wave radar sensing device;

the controlling the snow removal robot to travel, along the snow removal grids, to a nearest first target snow removal grid, and performing the snow removal operation on the first target snow removal grid, includes:

performing, by the millimeter-wave radar sensing device, a dynamic obstacle detection on a travelling path, while the snow removal robot travels toward the nearest first target snow removal grid;

in response to the millimeter-wave radar sensing device detecting a dynamic obstacle in front of the snow removal robot, controlling the snow removal robot to stop traveling;

acquiring information on the dynamic obstacle by the millimeter-wave radar sensing device, and marking, as a dynamic obstacle grid, a grid overlapping with the dynamic obstacle; and excluding the dynamic obstacle grid from the snow removal grids, and proceeding to the operation of searching, in a preset range with the snow removal robot as a center, for a first target snow removal grid whose potential energy value is greater than or equal to the potential energy value of the grid where the snow removal robot is currently located.

Furthermore, the traveling assembly is provided with a millimeter-wave radar sensing device;

the controlling the snow removal robot to travel, along the snow removal grids, to a nearest second target snow removal grid, and performing the snow removal operation on the second target snow removal grid, includes:

performing, by the millimeter-wave radar sensing device, a dynamic obstacle detection on a travelling path, while the snow removal robot travels toward the nearest second target snow removal grid;

in response to the millimeter-wave radar sensing device detecting a dynamic obstacle in front of the snow removal robot, controlling the snow removal robot to stop traveling;

acquiring information on the dynamic obstacle by the millimeter-wave radar sensing device, and marking, as a dynamic obstacle grid, a grid overlapping with the dynamic obstacle; and excluding the dynamic obstacle grid from the snow removal grids, and proceeding to the operation of searching, in the preset range with the snow removal robot as the center, for a second target snow removal grid whose potential energy value is less than the potential energy value of the grid where the snow removal robot is currently located.

Furthermore, the orienting a snow throwing direction of the snow throwing assembly toward the actual snow throwing grid, includes:

acquiring, based on the GPS-RTK localization technology, first relative position information between the grid where the snow removal robot is currently located and the actual snow throwing grid; and adjusting, based on the first relative position information, a snow throwing angle of the snow throwing assembly.

Furthermore, the snow throwing assembly includes a snow throwing driving device, a first rotary driving device, a second rotary driving device, a first snow throwing cylinder, and a second snow throwing cylinder; the first snow throwing cylinder is rotatably connected with the traveling assembly along a vertical axis, and the second snow throwing cylinder is rotatably connected with the first snow throwing cylinder along a horizontal axis; an end of the first snow throwing cylinder is connected with the snow feeding assembly, and the other end of the first snow throwing cylinder is connected with an end of the second snow throwing cylinder; the snow throwing driving device is arranged between the end of the first snow throwing cylinder and the snow feeding assembly, the first rotary driving device is connected with the first snow throwing cylinder, and the second rotary driving device is connected with the second snow throwing cylinder; and the snow throwing driving device is configured to drive the snow collected by the snow feeding assembly to be pushed into the first snow throwing cylinder and drive the snow to be threw out of the other end of the second snow throwing cylinder;

the acquiring, based on the GPS-RTK localization technology, first relative position information between the grid where the snow removal robot is currently located and the actual snow throwing grid, includes:

acquiring, based on the GPS-RTK localization technology, coordinates of a first central point of the grid where the snow removal robot is currently located, coordinates of a second central point of the actual snow throwing grid, taking, as a regulation reference segment, a horizontal connecting segment between the coordinates of the first central point and the coordinates of the second central point, and acquiring a length of the regulation reference segment;

driving, by the first rotary driving device, the first snow throwing cylinder to rotate so that a horizontal included angle between the regulation reference segment and an orientation of the other end of the second snow throwing cylinder in a horizontal plane is less than a first preset angle;

calculating, based on the length of the regulation reference segment, a snow throwing inclination, and driving, by the second rotary driving device, the second snow throwing cylinder to rotate, so that a vertical included angle between the regulation reference segment and an orientation of the other end of the second snow throwing cylinder in a vertical plane is equal to the snow throwing inclination.

Furthermore, the snow feeding assembly includes a snow feeding channel, a snow shovel, a snow feeding driving device, an elevating mechanism, an image sensing device, and an image processing module, the snow feeding channel is connected with the snow throwing assembly, the elevating mechanism is connected with the snow feeding channel, the snow shovel is provided at a snow inlet of the snow feeding channel, the snow feeding driving device is connected with the snow shovel, the image sensing device is provided in the snow feeding channel, and the image processing module is electrically connected with the image sensing device and the elevating mechanism;

the performing the snow removal operation on an arrived grid, includes:

driving, by the snow feeding driving device, the snow shovel to cut external snow, and driving the cut external snow to be fed into the snow feeding channel continuously;

acquiring, by the image sensing device, an image of the fed snow in the snow feeding channel, and transmitting the image to the image processing module;

determining, by the image processing module, whether a proportion of the snow in the image exceeds a first preset proportion threshold, and determining, by the image processing module, whether the proportion of the snow in the image is less than a second preset proportion threshold, where the first preset proportion threshold is greater than the second preset proportion threshold;

in response to the proportion exceeding the first preset proportion threshold, driving, by the elevating mechanism, the snow feeding channel to go up; and in response to the proportion being less than the second preset proportion threshold, driving, by the elevating mechanism, the snow feeding channel to go down.

Furthermore, the snow inlet is provided with an infrared sensing device, and the infrared sensing device is electrically connected with the snow feeding driving device;

after the driving, by the snow feeding driving device, the snow shovel to cut external snow, and driving the cut external snow to be fed into the snow feeding channel continuously, the method further includes:

acquiring, by the infrared sensing device, a temperature signal at the snow inlet; and in response to a fluctuation value of the temperature signal exceeding a preset temperature threshold, controlling the snow feeding driving device to stop working.

Furthermore, the snow shovel is made of rubber.

The embodiments of the disclosure further provide a snow removal robot, and the snow removal robot implements the above smart snow removal method. The snow removal robot includes:

a localization module, configured to generate a snow removal map by acquiring, based on GPS-RTK localization technology, latitude and longitude coordinates of a target snow throwing area, and latitude and longitude coordinates of a target snow removal area;

a grid processing module, configured to perform grid processing on the snow removal map;

a potential-filed processing module, configured to take a grid located in the target snow throwing area as a starting point, and assign, based on a breadth-first search algorithm, to grids located in the target snow removal area potential energy values in a manner of spreading outward; and a driving module, configured to control the snow removal robot to travel, grid by grid, from an uncleared grid whose potential energy value is currently the largest, and perform a snow removal operation on an arrived grid.

The embodiments of the disclosure further provide a smart snow removal equipment, which includes a controller and a memory. The memory is configured to store at least one instruction or at least one program which, when being loaded and executed by the controller, causes the above smart snow removal method to be implemented.

In the smart snow removal method provided by the embodiments of the disclosure, a snow removal map is generated based on GPS-RTK localization technology, grid processing is performed on the snow removal map, and potential-filed processing is performed on the grids obtained by the grid processing, based on a breadth-first search algorithm. Based on this, a snow removal robot may be controlled to travel, grid by grid, from an uncleared grid whose potential energy value is currently the largest, and perform a snow removal operation on an arrived grid. In this way, it achieves the purpose of clearing multiple areas through setting made at one time, which improves snow removal efficiency while enhancing a degree of intelligence of the snow removal robot.

As illustrated in FIG. 1, the embodiments of the disclosure provide a smart snow removal method implemented by a snow removal robot. The snow removal robot includes:

a traveling assembly, configured to travel along a planned path;

a snow feeding assembly provided on the traveling assembly, where the snow feeding assembly is configured to collect snow during a snow removal operation; and a snow throwing assembly provided on the traveling assembly and connected with the snow feeding assembly, where the snow throwing assembly is configured to throw the snow collected by the snow feeding assembly to a predetermined area during the snow removal operation.

The smart snow removal method includes operations as follows.

At S1, a snow removal map is generated by acquiring, based on GPS-RTK localization technology, latitude and longitude coordinates of a target snow throwing area and latitude and longitude coordinates of a target snow removal area, where there is a common boundary between the target snow throwing area and the target snow removal area.

At S2, grid processing is performed on the snow removal map.

At S3, potential-field processing is performed on the snow removal map, including: taking a grid located in the target snow throwing area as a starting point, and assigning, based on a breadth-first search algorithm, to grids located in the target snow removal area potential energy values in a manner of spreading outward, where the potential energy values increase with the number of spread layers.

At S4, the snow removal robot is controlled to travel, grid by grid, from an uncleared grid whose potential energy value is currently the largest, and performs the snow removal operation on an arrived grid, until the snow removal robot travels to the target snow throwing area.

In the illustrated embodiments, the traveling assembly may include a chassis and traveling wheels or tracks disposed on the chassis. The traveling wheels or the tracks may be driven by a power apparatus, in which the power apparatus may provide the drive by converting an energy such as electrical energy and thermal energy into a mechanical energy. A snow removal assembly may include the snow feeding assembly and the snow throwing assembly. The snow feeding assembly may include a snow shovel and a matched driving device. The driving device may drive the snow shovel to cut the snow in the target snow removal area, and drive the snow shovel to move to continuously push the cut snow toward a direction of the snow throwing assembly. The snow throwing assembly may include a snow throwing cylinder and a matched driving device. The driving device may drive the snow pushed by the snow feeding assembly to be continuously delivered into the snow throwing cylinder. The snow throwing cylinder limits an exit direction of the snow, based on a direction of an interior channel of the snow throwing cylinder. The snow may be eventually thrown, under guidance of the snow throwing cylinder, at a predetermined angle to the target snow throwing area where the snow does not affect normal travel of pedestrians and vehicles. In this way, a purpose of clearing snow and avoiding snow blockage on the road is achieved.

In the related technology, the ultra-wide band (UWB) tag wireless carrier communication is commonly used for the localization of a snow removal vehicle (a snow blower a snow thrower). Specifically, three mobile base stations with respective identifiers are used as signal transmitters, and an electronic fence is defined through enclosure of the three mobile base stations. A locating rod of the snow removal vehicle is used as a signal receiver. Location information of the mobile base stations is acquired, and the location information is combined with information such as a current driving speed, an angular velocity, and an orientation of the snow removal vehicle to calculate coordinates of the snow removal vehicle at a designated position. In this way, an internal program of the snow removal vehicle may realize a function of automatically removing the snow based on a series of acquired coordinate information and a path-planning algorithm. This technology has a limitation that the snow of a small area (which is usually not larger than an area of 28 m*28 m) is cleared. In addition, since three mobile base stations with identifiers are required to define the electronic fence, only one area enclosed by the electronic fence can be cleared in one snow removal program. In this case, when a user needs to clear more than one area, the mobile base stations must be moved; and it is not possible to implement multiple snow removal programs through setting made at one time.

Based on the above deficiencies of the related art, the illustrated embodiments correspondingly provide the smart snow removal method. Specifically, the GPS-RTK localization technology is a known technology, which may realize the precise localization of the snow removal robot through a satellite and a signal-assisted base station. Specifically, an internal algorithm of the snow removal robot is adapted for a location signal returned by the GPS-RTK, so that the target snow throwing area and the target snow removal area can be set at any area covered by the satellite, and the snow removal map with accurate latitude and longitude coordinates can be obtained, thereby breaking through the limitation of the existing localization approach.

After the snow removal map is acquired, the snow removal map may be divided into multiple grids through the grid processing, and each grid is assigned with a corresponding potential energy value based on the breadth-first search (BFS) algorithm. As illustrated in FIG. 2, the potential energy values of the grids in the target snow throwing area may be set as 0. Each time one layer is spread outward from the target snow throwing area (i.e., one layer is spread toward the target snow removal area), the potential energy value of each grid in this layer is increased by 1, finally forming a distribution diagram of potential energy values illustrated in FIG. 2.

After the above potential-field processing is completed, the snow removal robot may be controlled to start from any one of uncleared grids whose potential energy values are currently the largest (i.e., an uncleared grid having the potential energy value of 8). After this grid is cleared by the snow removal robot, this grid gets into a cleared state (an electronic mark may be set to the position corresponding to this grid in the snow removal map, to distinguish this grid from grids in an uncleared state). At this time, the snow removal robot moves to a next uncleared grid whose potential energy value is currently the largest (which may be an uncleared grid that has the potential energy value of 8 and is adjacent to the previous grid), and performs the snow removal operation thereat. It can be understood that, after the snow removal robot clears all the girds having the potential energy value of 8, the grid whose potential energy value is currently the largest becomes an uncleared gird having the potential energy value of 7. The snow removal robot moves to a grid which has the potential energy value of 7 and is adjacent to the currently located grid, and repeat the clearing operation and a cruising operation. Based on the above path-planning approach, a traveling path of the snow removal robot is obtained as illustrated in FIG. 3. It can be seen that, after the snow removal robot performs the snow removal operation on all grids having the potential energy value of 1, a next target to which the snow removal robot moves can only be the gird having the potential energy value of 0 in the target snow throwing area; that is, at this time, the snow removal robot has completed the snow removal operation for all the grids in the target snow removal area.

In some implementations, during a process that the snow removal robot travels along the girds, the snow throwing assembly always throws the snow in a direction toward an uncleared grid whose potential energy value is less than the potential energy value of the grid where the snow removal robot is currently located, so that the snow is further cleared in the subsequent snow removal operation. As such, it can avoid the snow from being mistakenly thrown to the cleared grids and avoid the snow removal effect from being damaged.

Figure 7:
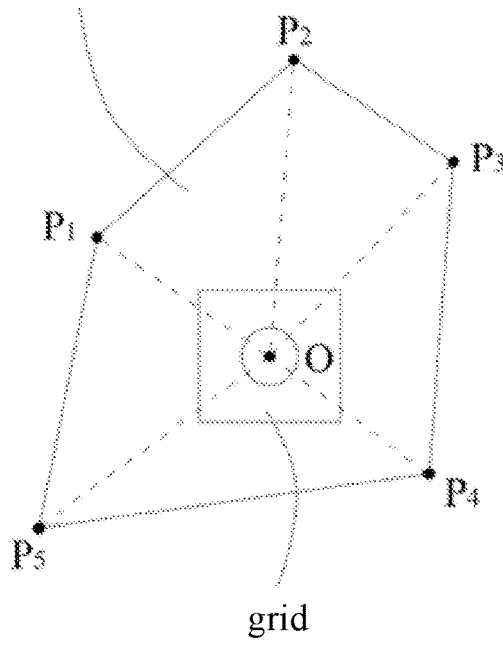
FIG. 7 is a first schematic diagram illustrating determination of a snow removal grid based on an angle method in the snow removal method according to some embodiments of the disclosure.
Figure 8:
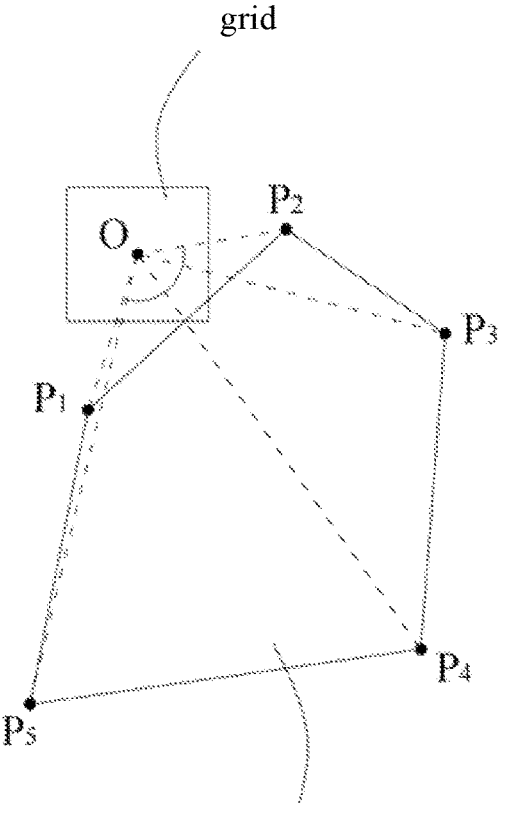
FIG. 8 is a second schematic diagram illustrating determination of the snow removal grid based on the angle method in the snow removal method according to some embodiments of the disclosure.

Furthermore, as illustrated in FIG. 7 and FIG. 8, in some exemplary embodiments, after the grid processing is performed on the snow removal map, the method further includes operations as follows.

At S21, it is determined, based on an angle method, whether each grid is located in the target snow removal area, including: for each grid, taking connecting lines respectively between a central point of the grid and individual vertices of the target snow removal area as first auxiliary lines, and determining whether a sum of included angles between adjacent ones of all the first auxiliary lines is equal to 360°; and in response to the sum of the included angles being equal to 360°, determining that the grid is located in the target snow removal area.

At S22, each grid located in the target snow removal area is set as a snow removal grid, and each grid located in the target snow throwing area is set as a snow throwing grid.

The operation of taking a grid located in the target snow throwing area as a starting point, assigning, based on a breadth-first search algorithm, to grids located in the target snow removal area potential energy values in a manner of spreading outward, includes an operation as follows.

At S31, the snow throwing grid is set as the starting point, and based on the breadth-first search algorithm, the potential energy values are assigned to the snow removal grids in the manner of spreading outward.

After the grid processing is performed on the snow removal map, it is determined whether each grid is located in the target snow removal area. Vertices of the target snow removal area may be determined based on the latitude and longitude coordinates of the target snow removal area. Specifically, as illustrated in FIG. 7, in a horizontal projection plane, connecting lines between a central point O of a grid and five vertices $P_1$, $P_2$, $P_3$, $P_4$, and $P_5$ of the target snow removal area (i.e., the first auxiliary lines) are $OP_1$, $OP_2$, $OP_3$, $OP_4$, and $OP_5$, respectively, and five included angles between every two adjacent ones of the five first auxiliary lines are $\angle P_1OP_2$, $\angle P_2OP_3$, $\angle P_3OP_4$, $\angle P_4OP_5$, and $\angle P_5OP_1$, respectively. As can be seen, a sum of the five included angles is equal to 360°, it may be thus determined that the grid is located in the target snow removal area (that is, the grid is the snow removal grid). As illustrated in FIG. 8, in a horizontal projection plane, connecting lines between a central point O of a grid and five vertices $P_1$, $P_2$, $P_3$, $P_4$, and $P_5$ of the target snow removal area (i.e., the first auxiliary lines) are $OP_1$, $OP_2$, $OP_3$, $OP_4$, and $OP_5$, respectively, and five included angles between adjacent ones of the five first auxiliary lines are $\angle P_1OP_5$, $\angle P_5OP_4$, $\angle P_4OP_3$, $\angle P_3OP_2$, and $\angle P_2OP_1$ respectively. As can be seen, the sum of the five included angles is less than 360°, it may be thus determined that the grid is located outside the target snow removal area.

After all the snow removal girds are determined based on the above approach, a basis may be provided for subsequent potential-field processing, so as to determine a subsequent path for the snow removal robot to travel in the snow removal area.

Furthermore, as illustrated in FIG. 7 and FIG. 8, in some exemplary embodiments, the operation of for each grid, taking connecting lines respectively between a central point of the grid and individual vertices of the target snow removal as first auxiliary lines, and determining whether a sum of included angles between adjacent ones of all the first auxiliary lines is equal to 360°, includes operation as follows.

At S211, it is determined whether the central point satisfies the following formula:

$$\sum_{i\in P, j=i+1(next)} \sin^{-1}\left(\frac{\overrightarrow{OP_i}\times\overrightarrow{OP_j}}{|\overrightarrow{OP_i}|*|\overrightarrow{OP_j}|}\right) = 2k\pi(k\in Z)$$

where O represents coordinates of the central point, $P_i$ and $P_j$ represent coordinates of two adjacent vertices of the target snow removal area, superscripts of $\overrightarrow{OP_i}$and $\overrightarrow{OP_j}$represent vector symbols, and Z represents a set of integers.

At S212, in response to the formula being satisfied, it is determined that the sum of the included angles between adjacent ones of all the first auxiliary lines is equal to 360°.

The coordinates of O, $P_i$, and $P_j$ may be acquired based on the GPS-RTK localization technology. Based on the above cross-product of vectors, it can be easily determined whether the sum of the included angles between adjacent ones of all the first auxiliary lines corresponding to the central point of a grid is equal to 360°, thereby enabling the snow removal grid to be determined quickly.

Figure 4:
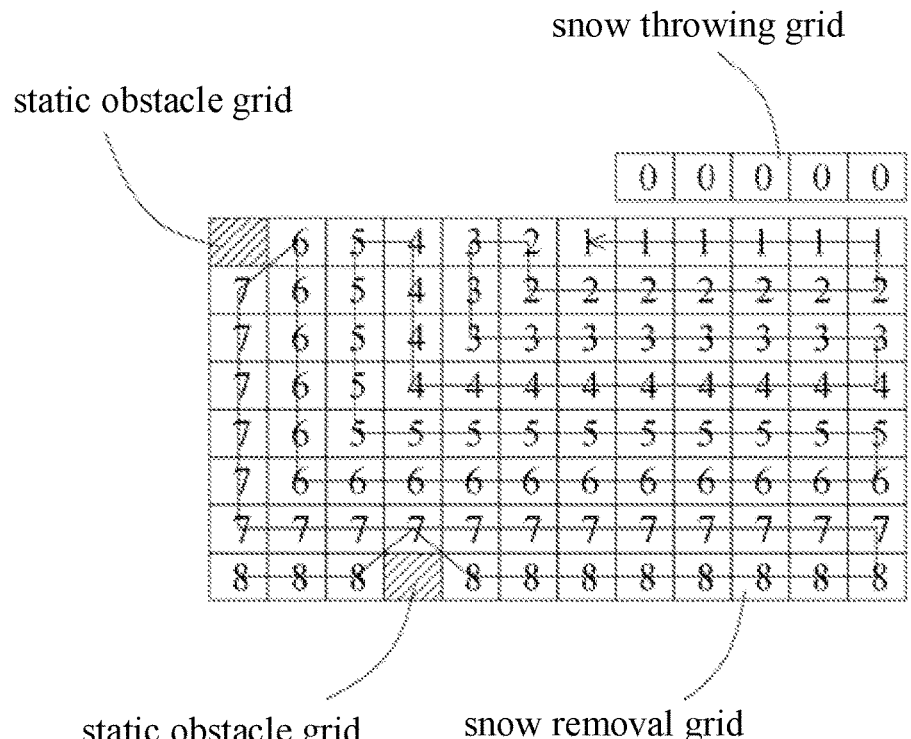
FIG. 4 is a schematic diagram illustrating a second path planning for the snow removal robot in the snow removal method according to some embodiments of the disclosure.
Figure 9:
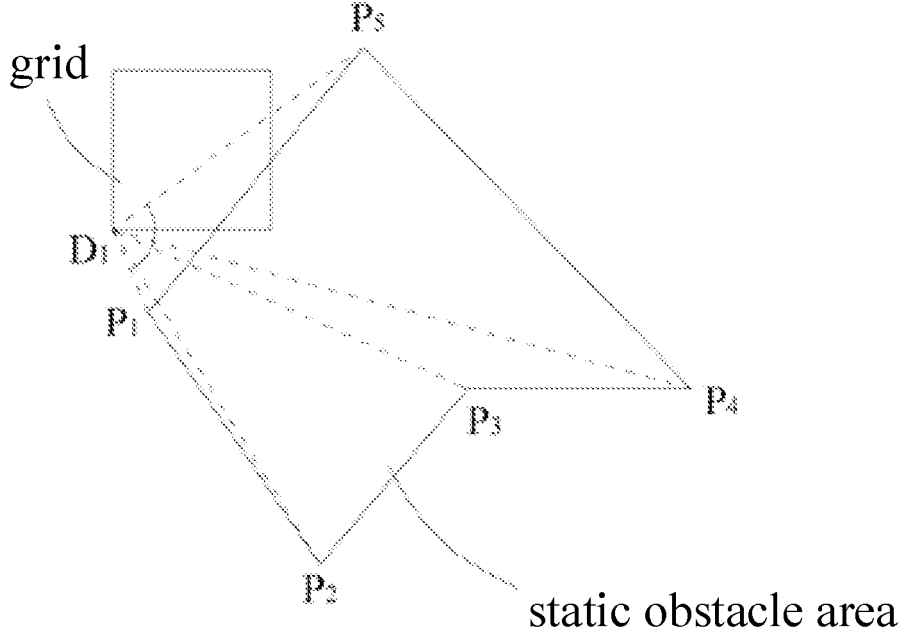
FIG. 9 is a first schematic diagram illustrating determination of a static obstacle grid based on the angle method in the snow removal method according to some embodiments of the disclosure.
Figure 12:
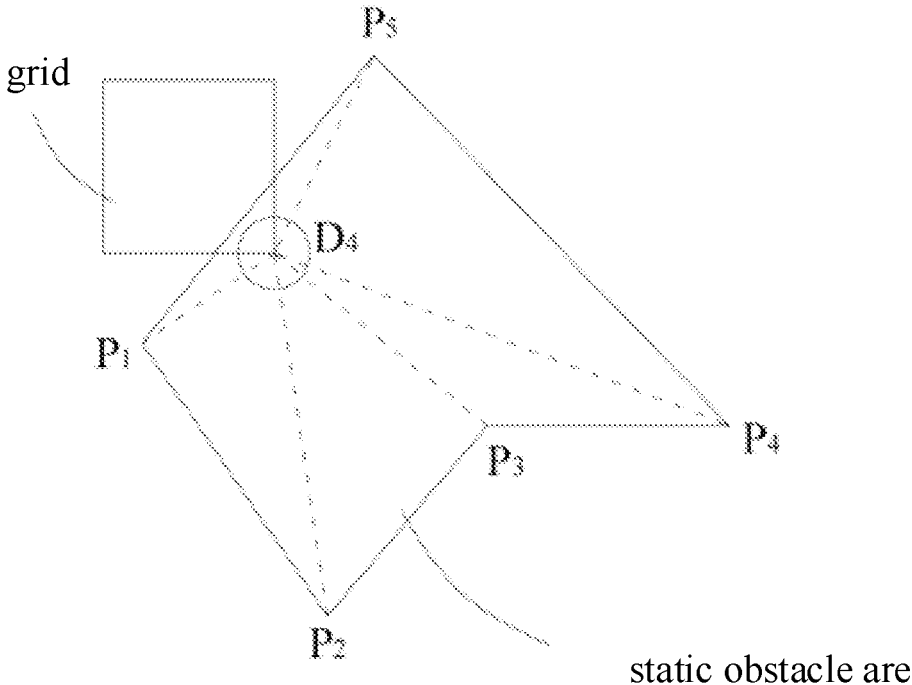
FIG. 12 is a fourth schematic diagram illustrating determination of the static obstacle grid based on the angle method in the snow removal method according to some embodiments of the disclosure.

Furthermore, as illustrated in FIG. 4, FIG. 9 and FIG. 12, in some exemplary embodiments, the operation of generating a snow removal map by acquiring, based on GPS-RTK positioning technology, latitude and longitude coordinates of a target snow throwing area and latitude and longitude coordinates of a target snow removal area, includes an operation as follows.

At S11, the snow removal map is generated by acquiring, based on the GPS-RTK localization technology, the latitude and longitude coordinates of the target snow throwing area, the latitude and longitude coordinates of the target snow removal area, and latitude and longitude coordinates of a static obstacle area.

After the grid processing is performed on the snow removal map, the method further includes operations as follows.

At S23, it is determined, based on an angle method, whether each grid overlaps with the static obstacle area, including: for each grid, taking connecting lines respectively between each grid vertex of the grid and individual vertices of the static obstacle area as second auxiliary lines, and determining, for each grid vertex of the grid, whether a sum of included angles between adjacent ones of all the second auxiliary lines corresponding to the grid vertex is equal to 360°; and in response to the sum of the included angles between adjacent ones of all the second auxiliary lines corresponding to any grid vertex of a grid is equal to 360°, it is determined that this grid overlaps with the static obstacle area.

At S24, each grid overlapping with the static obstacle area is set as a static obstacle grid.

Before the operation of taking the snow throwing grid as the starting point, and assigning, based on the breadth-first search algorithm, the potential energy values to the snow removal grids in the manner of spreading outward, the method further includes an operation as follows.

At S03, it is determined whether the snow removal grids include the static obstacle grid; and in response to the snow removal grids including the static obstacle grid, the static obstacle grid is excluded from the snow removal grids.

Figure 10:
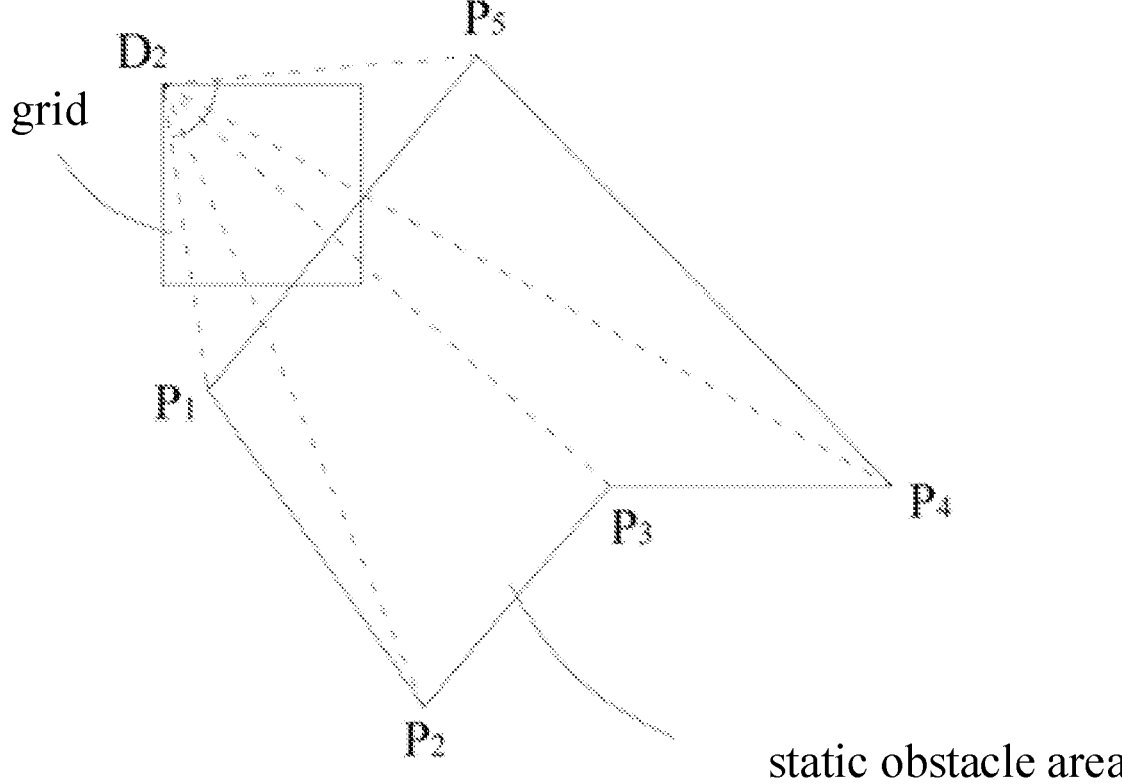
FIG. 10 is a second schematic diagram illustrating determination of the static obstacle grid based on the angle method in the snow removal method according to some embodiments of the disclosure.
Figure 11:
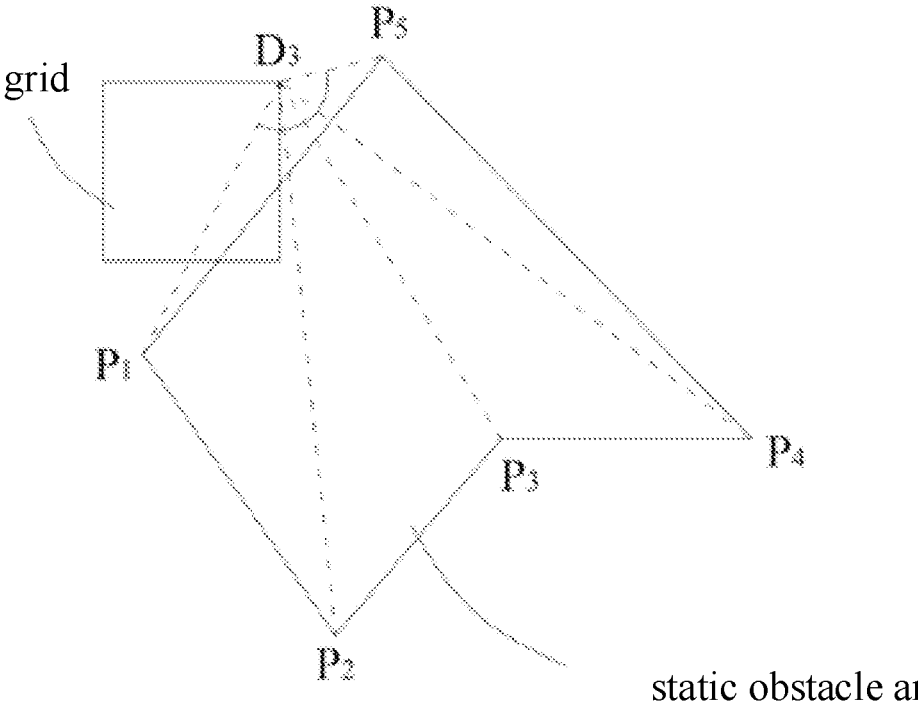
FIG. 11 is a third schematic diagram illustrating determination of the static obstacle grid based on the angle method in the snow removal method according to some embodiments of the disclosure.

A static obstacle refers to an obstacle located at a fixed location in the target snow removal area. After the grid processing is performed on the snow removal map, it requires to determine a grid(s) occupied by the static obstacle, to prevent the snow removal robot from entering such grid(s) and colliding with the static obstacle in a subsequent travel process. Vertices of the static obstacle area may be determined based on the latitude and longitude coordinates of the static obstacle area. Specifically, in a horizontal projection plane, connecting lines between each of four grid vertices $D_1$, $D_2$, $D_3$, and $D_4$ of the grid and five vertices $P_1$, $P_2$, $P_3$, $P_4$, and $P_5$ of the static obstacle area (i.e., the second auxiliary lines) are illustrated in FIG. 9 to FIG. 12. As illustrated in FIG. 9, five included angles between the five second auxiliary lines corresponding to a first grid vertex $D_1$ are $\angle P_1D_1P_2$, $\angle P_2D_1P_3$, $\angle P_3D_1P_4$, $\angle P_4D_1P_5$, and $\angle P_5D_1P_1$ respectively. As can be seen, the sum of the five included angles is less than 360°, and thus it may be determined that the first grid vertex $D_1$ is located outside the static obstacle area. As illustrated in FIG. 10, five included angles between the five second auxiliary lines corresponding to a second grid vertex $D_2$ are $\angle P_1D_2P_2$, $\angle P_2D_2P_3$, $\angle P_3D_2P_4$, $\angle P_4D_2P_5$, and $\angle P_5D_2P_1$, respectively. As can be seen, the sum of the five included angles is less than 360°, and thus it may be determined that the second grid vertex $D_2$ is located outside the static obstacle area. As illustrated in FIG. 11, five included angles between the five second auxiliary lines corresponding to a third grid vertex $D_3$ are $\angle P_1D_3P_2$, $\angle P_2D_3P_3$, $\angle P_3D_3P_4$, $\angle P_4D_3P_5$, and $\angle P_5D_3P_1$ respectively. As can be seen, the sum of the five included angles is less than 360°, and thus it may be determined that the third grid vertex $D_3$ is located outside the static obstacle area. As illustrated in FIG. 12, five included angles between the five second auxiliary lines corresponding to a fourth grid vertex $D_4$ are $\angle P_1D_4P_2$, $\angle P_2D_4P_3$, $\angle P_3D_4P_4$, $\angle P_4D_4P_5$, and $\angle P_5D_4P_1$, respectively. As can be seen, the sum of the five included angles is equal to 360°, and thus it may be determined that the fourth grid vertex $D_4$ is located in the static obstacle area. Based on the above, since there is one grid vertex of the grid that is located in the static obstacle area (i.e., the fourth grid vertex $D_4$), it may be determined that the grid overlaps with the static obstacle area, and the grid is taken as the static obstacle grid.

After all the static obstacle grids are determined based on the above approach, the static obstacle grids may be excluded from the snow removal grids, so that the static obstacle grids are not involved in the subsequent potential-field processing and are not be assigned with a potential energy vale. A planned path obtained after exclusion of the static obstacle grids is illustrated in FIG. 4. Since the traveling path of the snow removal robot only passes grids having the potential energy value, the above operation can prevent the snow removal robot from entering into the static obstacle grid and colliding with the static obstacle, thereby enabling an automatic obstacle avoidance function of the snow removal robot.

Furthermore, as illustrated in FIG. 9 to FIG. 12, in some exemplary embodiments, the operation of for each grid, taking connecting lines respectively between each grid vertex of the grid and individual vertices of the static obstacle area as second auxiliary lines, and determining, for each grid vertex of the grid, whether a sum of included angles between adjacent ones of all the second auxiliary lines corresponding to the grid vertex is equal to 360°, includes operations as follows.

At S231, it is determined whether the grid vertex of the grid satisfies the following formula:

$$\sum_{i\in P, j=i+1(next)} \sin^{-1}\left(\frac{\overrightarrow{DP_i}\times\overrightarrow{DP_j}}{|\overrightarrow{DP_i}|*|\overrightarrow{DP_j}|}\right) = 2k\pi(k\in Z)$$

where D represents coordinates of the grid vertex of the grid, $P_i$ and $P_j$ represent coordinates of two adjacent vertices of the static obstacle area, superscripts of $\overrightarrow{DP_i}$ and $\overrightarrow{DP_j}$ represent vector symbols, and Z represents a set of integers.

At S232, in response to the formula being satisfied, it is determined that the sum of the included angles between adjacent ones of all the second auxiliary lines corresponding to the grid vertex of the grid is equal to 360°.

The coordinates of D, $P_i$, and $P_i$ may be acquired based on the GPS-RTK localization technology. Based on the above cross-product of vectors, it can be easily determined whether the sum of the included angles between adjacent ones of all the second auxiliary lines corresponding to each grid vertex of the grid is equal to 360°, thereby enabling the static obstacle grid to be determined quickly.

Furthermore, as illustrated in FIG. 2 to FIG. 6, in some exemplary embodiments, the controlling the snow removal robot to travel grid by grid from an uncleared grid whose potential energy value is currently the largest, and performing the snow removal operation on an arrived grid, includes operations as follows.

At S41, in response to the snow removal robot completing the snow removal operation on a snow removal grid where the snow removal robot is currently located, it is searched, in a preset range with the snow removal robot as a center, for a first target snow removal grid whose potential energy value is greater than or equal to the potential energy value of the grid where the snow removal robot is currently located, where the first target snow removal grid is in an uncleared state.

At S42, when it is searched out, in the preset range, at least one first target snow removal grid whose potential energy value is greater than or equal to the potential energy value of the grid where the snow removal robot is currently located, the snow removal robot is controlled to travel, along the snow removal grids, to a nearest first target snow removal grid, and performs the snow removal operation on this first target snow removal grid.

At S43, when it is searched out, in the preset range, no first target snow removal grid whose potential energy value is greater than or equal to the potential energy value of the grid where the snow removal robot is currently located, it is searched, in the preset range with the snow removal robot as the center, for a second target snow removal grid whose potential energy value is less than the potential energy value of the grid where the snow removal robot is currently located, where the second target snow removal grid is in the uncleared state.

At S44, when it is searched out, in the preset range, at least one second target snow removal grid whose potential energy value is less than the potential energy value of the grid where the snow removal robot is currently located, the snow removal robot is controlled to travel, along the snow removal grids, to a nearest second target snow removal grid, and performs the snow removal operation on the second target snow removal grid.

Specifically, the preset range may be a range defined by multiple grids with the snow removal robot as a center, e.g., a range of 8 grids with the snow removal robot as the center. As illustrated in FIG. 3, after the potential-field processing is performed, the snow removal robot may be controlled to start from any one of the uncleared grids whose potential energy values are currently the largest (i.e., the uncleared grid having the potential energy value of 8). After this grid is cleared by the snow removal robot, this grid gets into the cleared state (an electronic mark may be set to the position corresponding to this grid in the snow removal map, to distinguish this grid from grids in the uncleared state). At this time, the snow removal robot moves to a next uncleared grid that is closest to the grid where the snow removal robot is currently located (i.e., the currently located grid) and has the potential energy value greater than or equal to the potential energy value of the currently located grid (that is, the next uncleared grid is a first target snow removal grid that is adjacent to the grid where the snow removal robot is currently located and has the potential energy value of 8), and performs the snow removal operation thereat; and the above operations are repeated. After the snow removal robot clears all the girds having the potential energy value of 8, in the preset range, there is no more uncleared grid whose potential energy value is equal to or greater than the potential energy value of the grid where the snow removal robot is currently located. At this time, the snow removal robot searches, in the preset range, for an uncleared gird having the potential energy value of 7 (i.e., a second target snow removal grid), and the snow removal robot is controlled to move to a nearest second target snow removal grid (which is adjacent to the grid where the snow removal robot is currently located and has the potential energy value of 7) and performs the snow removal operation thereat. The above operations are repeated, until the snow removal robot completes the snow removal operation on all the snow removal grids, based on the planning path illustrated in FIG. 3.

Figure 5:
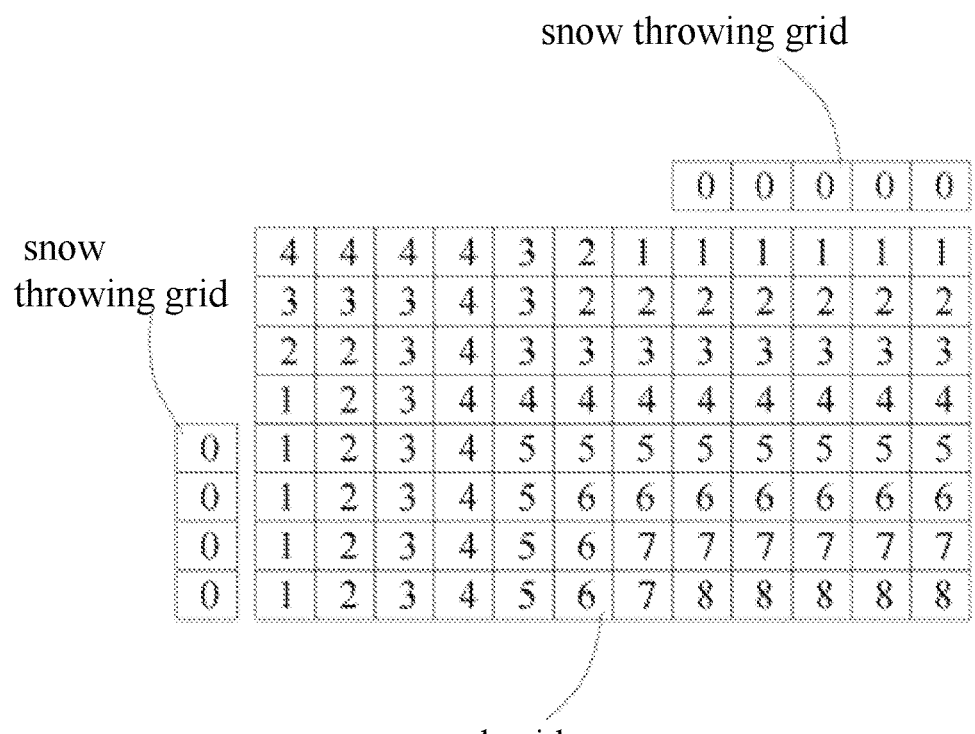
FIG. 5 is a second schematic diagram illustrating potential field values of grids in the snow removal method according to some embodiments of the disclosure.
Figure 6:
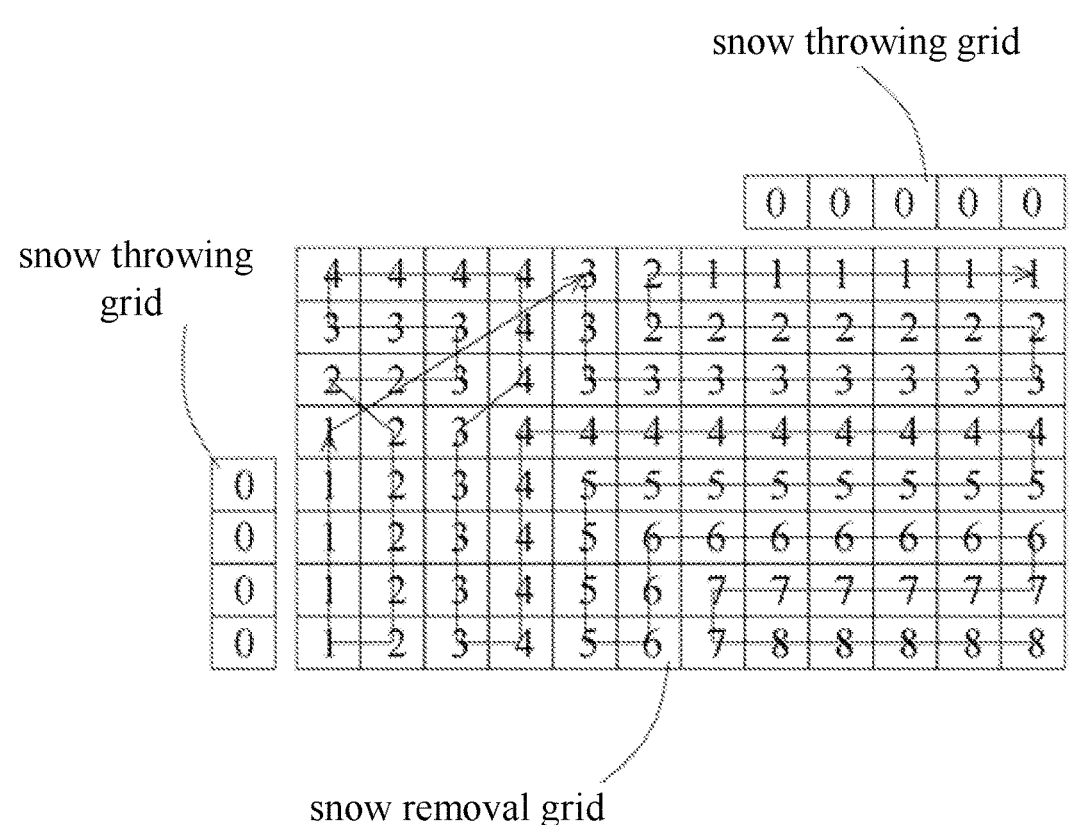
FIG. 6 is a schematic diagram illustrating a third path planning for the snow removal robot in the snow removal method according to some embodiments of the disclosure.

Furthermore, as illustrated in FIG. 5 and FIG. 6, in some exemplary embodiments, after the operation of searching, in the preset range with the snow removal robot as the center, for a second target snow removal grid whose potential energy value is less than the potential energy value of the grid where the snow removal robot is currently located, the method further includes operations as follows.

At S431, when it is searched out, in the preset range, no second target snow removal grid whose potential energy value is less than the potential energy value of the grid where the snow removal robot is currently located, it is searched for the snow throwing grid in the preset range with the snow removal robot as the center.

At S432, when it is searched out the snow throwing grid in the preset range, it is searched for a third target snow removal grid that is uncleared in the snow removal map.

At S433, when it is searched out at least one third target snow removal grid in the snow removal map, the snow removal robot is controlled, based on a D*Lite algorithm, to travel, along the snow removal grids, to a third target snow removal grid whose potential energy value is the largest, and performs the snow removal operation on the third target snow removal grid.

At S434, in response to the snow removal robot completing the snow removal operation on the third target snow removal grid, it proceeds to the operation of searching, in the preset range with the snow removal robot as the center, for a first target snow removal grid whose potential energy value is larger than or equal to the potential energy value of the grid where the snow removal robot is currently located.

When the snow throwing grids are provided at multiple places, the potential field processing is performed by taking the snow throwing grids located the multiple places together as a starting point, and an obtained distribution diagram of the potential energy values of the grids is illustrated in FIG. 5. It is illustrated by taking a case where the snow throwing grids are provided at two places as shown in FIG. 5 and FIG. 6 as an example. After the snow removal robot travels, based on the above path planning approach, to a position close to the snow throwing girds located on a left side, and clears thereat all the snow removal grids having the potential energy of 1 that are located in the outer layer of the snow throwing grids, there are still some uncleared snow removal girds in the snow removal map (i.e., the uncleared snow removal grids close to the snow throwing grids located on a right side). At this time, the D*Lite path planning algorithm may be used to search for the uncleared third target snow removal grids in the snow removal map, and the snow removal robot is controlled to travel to one third target snow removal grid whose potential energy value is currently the largest (i.e., a third target snow removal grid that is close to the snow removal grids located on the right side and has the potential energy value of 3, as illustrated in FIG. 6) and performs the snow removal operation thereat. After this snow removal operation is completed, the grid where the snow removal robot is currently located is taken as a starting point, and the snow removal robot repeats operations S41 to S44 based on the above path planning approach, until the snow removal robot clears all the snow removal grids having the potential energy value of 1 located in the outer layer of the snow throwing grids on the right side. At this time, the clearing of all the snow removal grids in the snow removal map has been completed. The traveling path of the snow removal robot is illustrated in FIG. 6.

Furthermore, as illustrated in FIG. 2 to FIG. 6, in some exemplary embodiments, the operation of performing the snow removal operation on an arrived grid, includes operations as follows.

At S45, snow is collected by the snow feeding assembly.

At S46, it is determined whether there is a snow throwing grid in a preset range.

At S47, when no snow throwing grid is in in the preset range, an uncleared snow removal grid, whose potential energy value is the lowest in the preset range is taken as an actual snow throwing grid.

At S48, when a snow throwing grid is in the preset range, the at least one snow throwing grid is taken as the actual snow throwing grid.

At S49, a snow throwing direction of the snow throwing assembly is orientated toward the actual snow throwing grid.

The snow throwing strategy provided in the illustrated embodiments ensures that the snow is always thrown in a direction toward the uncleared grid whose potential energy value is less than the potential energy value of the grid where the snow removal robot is currently located, so that the snow is further cleared in the subsequent snow removal operation. As illustrated in FIG. 3, FIG. 4 and FIG. 6, when the snow removal robot travels on the snow removal grids with the potential energy value of 8, the snow removal grid having the potential energy value of 7 may be taken as the actual snow throwing grid. As such, when the snow removal robot travels to the snow removal grid having the potential energy value of 7, the snow that was previously thrown onto such grid may be cleared together. When the snow removal robot travels on the snow removal grid having the potential energy value of 1, the adjacent snow throwing grid(s) may be used as the actual snow throwing grid(s). Through these operations, it can avoid the snow from being mistakenly thrown to the cleared grids and avoid the snow removal effect from being damaged.

Furthermore, in some exemplary embodiments, a mark indicating the uncleared state is set on each of the snow throwing grids and each snow removal gird for which the snow removal robot has not performed the snow removal operation, and a mark indicating the cleared state is set on each of the snow removal grids for which the snow removal robot has performed the snow removal operation.

By setting the marks, the cleaning state of each grid may be recorded in real time, to ensure the accuracy of path planning.

Furthermore, in some exemplary embodiments, the traveling assembly is provided thereon with a millimeter-wave radar sensing device.

The operation of controlling the snow removal robot to travel, along the snow removal grids, to a nearest first target snow removal grid, and performing the snow removal operation on this first target snow removal grid, includes operations as follows.

At S421, a dynamic obstacle detection is performed on the traveling path through the millimeter-wave radar sensing device, while the snow removal robot travels toward the nearest first target snow removal grid.

At S422, in response to the millimeter-wave radar sensing device detecting a dynamic obstacle in front of the snow removal robot, the snow removal robot is controlled to stop traveling.

At S423, information on the dynamic obstacle is acquired by the millimeter-wave radar sensing device, and a grid overlapping with the dynamic obstacle is marked as a dynamic obstacle grid.

At S424, the dynamic obstacle grid is excluded from the snow removal grids, and it proceeds to the operation of searching, in the preset range with the snow removal robot as the center, for a first target snow removal grid whose potential energy value is larger than or equal to the potential energy value of the grid where the snow removal robot is currently located.

Furthermore, in some exemplary embodiments, the traveling assembly is provided there on with a millimeter-wave radar sensing device.

The operation of controlling the snow removal robot to travel, along the snow removal grids, to a nearest second target snow removal grid, and performing the snow removal operation on this second target snow removal grid, includes operations as follows.

At S441, a dynamic obstacle detection is performed on the traveling path through the millimeter-wave radar sensing device, while the snow removal robot travels toward the nearest second target snow removal grid.

At S442, in response to the millimeter-wave radar sensing device detecting a dynamic obstacle in front of the snow removal robot, the snow removal robot is controlled to stop traveling.

At S443, information on the dynamic obstacle is acquired by the millimeter-wave radar sensing device, and a grid overlapping with the dynamic obstacle is marked as a dynamic obstacle grid.

At S444, the dynamic obstacle grid is excluded from the snow removal grids, and it proceeds to the operation of searching, in the preset range with the snow removal robot as the center, for a second target snow removal grid whose potential energy value is less than the potential energy value of the grid where the snow removal robot is currently located.

Figure 14:
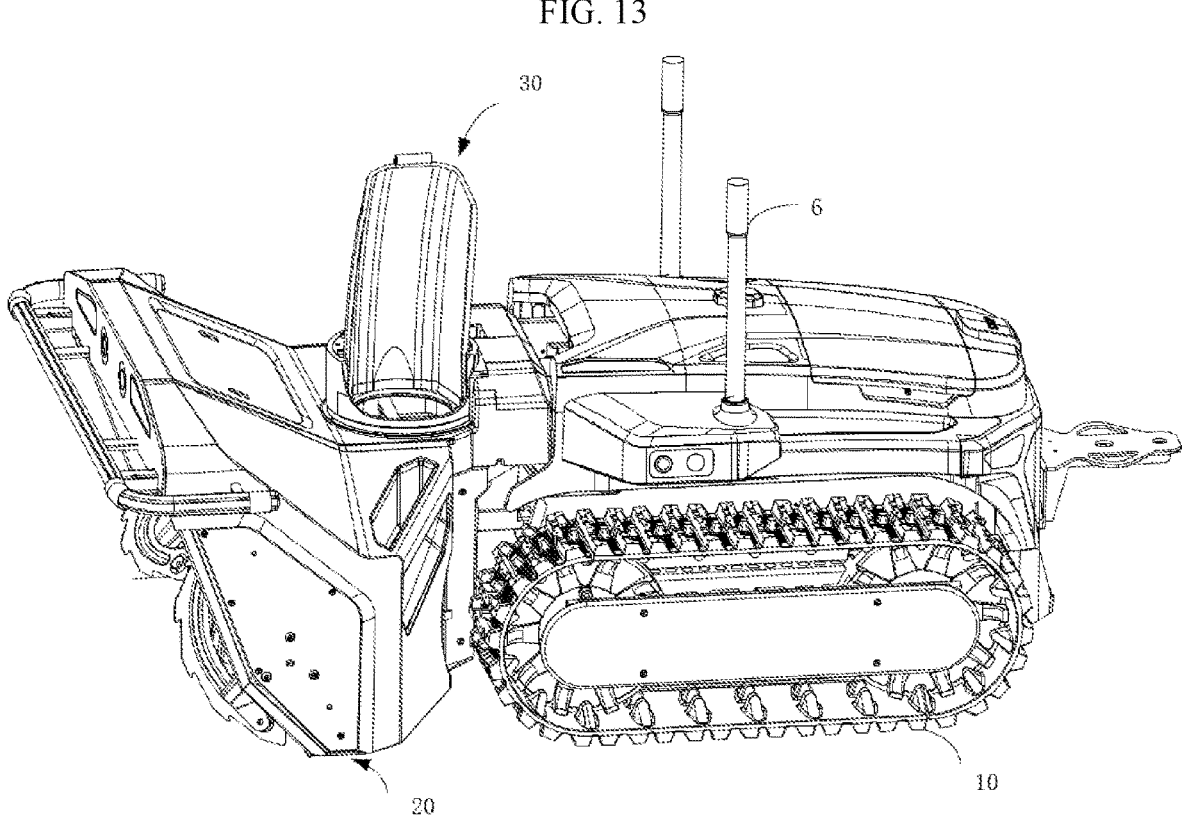
FIG. 14 is a first schematic structural diagram of the snow removal robot.

The dynamic obstacle refers to an obstacle that temporarily appears in the target snow removal area during the travel of the snow removal robot. By means of the millimeter-wave radar sensing device, the dynamic obstacle in the travel direction of the snow removal robot may be detected, so as to control the snow removal robot to stop in time, thereby avoiding collision. Based on a combination of the millimeter-wave radar sensing device and the GPS-RTK localization technology, information, such as specific coordinates, of the dynamic obstacle may be acquired, so that a dynamic obstacle grid may be determined through the above angle method which is used to determine the snow removal grid and the static obstacle grid. After the dynamic obstacle grid is determined, such dynamic obstacle grid may be excluded from the snow removal grids, and the above path planning operation for the snow removal grids may be performed once again based on the grid where the snow removal robot is currently located, in such a manner that the dynamic obstacle grid is not involved in this path planning operation. Since the traveling path of the snow removal robot is always located on the snow removal grid having the potential energy value, after the dynamic obstacle grid is excluded from the snow removal grids, the snow removal robot can be prevented from entering into the dynamic obstacle grid and colliding with the dynamic obstacle during the traveling process, thereby further improving the automatic obstacle avoidance function of the snow removal robot. FIG. 14 illustrates an example of the traveling assembly 10, the snow feeding assembly 20, the snow throwing assembly 30, and the millimeter-wave radar sensing device 11. It is notable that FIG. 14 is only an example, and is not intend to be limiting.

Figure 13:
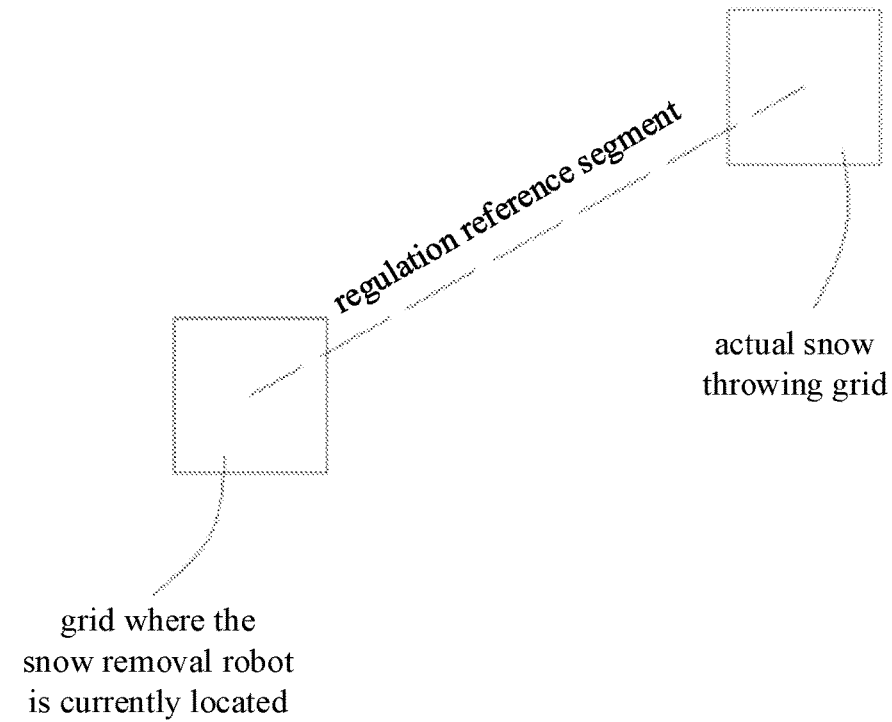
FIG. 13 is a schematic diagram illustrating a regulation reference segment in the snow removal method according to some embodiments of the disclosure.
Figure 15:
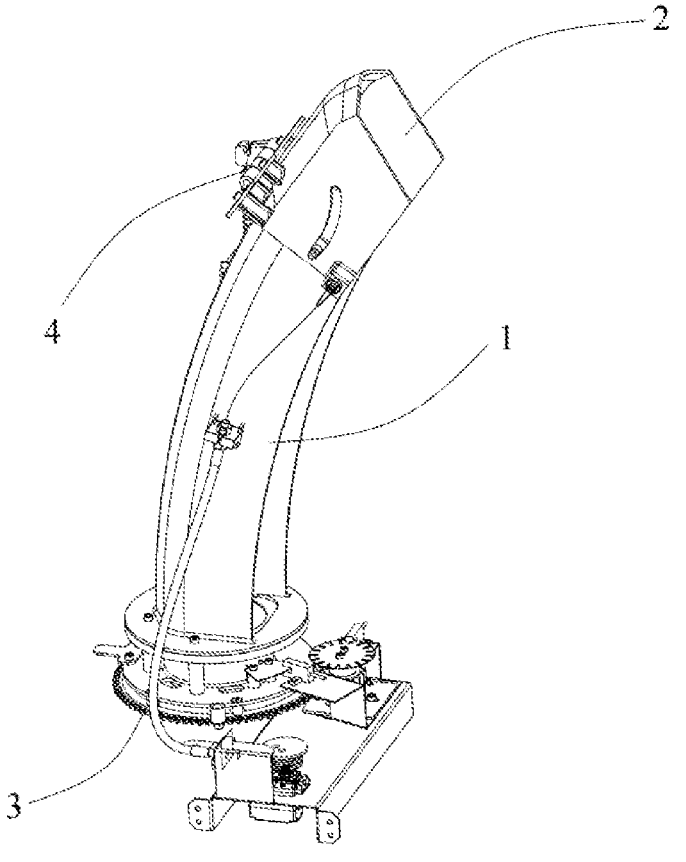
FIG. 15 is a schematic structural diagram of a snow throwing assembly of the snow removal robot used in the snow removal method according to some embodiments of the disclosure.

Furthermore, as illustrated in FIG. 13 and FIG. 15, in some exemplary embodiments, the operation of orienting a snow throwing direction of the snow throwing assembly toward the actual snow throwing grid, includes operations as follows.

At S491, based on the GPS-RTK localization technology, first relative position information between the grid where the snow removal robot is currently located and the actual snow throwing grid is acquired.

At S492, based on the first relative position information, a snow throwing angle of the snow throwing assembly is adjusted.

In some implementations, as illustrated in FIG. 15, the snow throwing assembly includes a snow throwing driving device, a first rotary driving device 3, a second rotary driving device 4, a first snow throwing cylinder 1, and a second snow throwing cylinder 2. The first snow throwing cylinder 1 is rotatably connected with the traveling assembly along a vertical axis, and the second snow throwing cylinder 2 is rotatably connected with the first snow throwing cylinder 1 along a horizontal axis. An end of the first snow throwing cylinder 1 is connected with the snow feeding assembly, and the other end of the first snow throwing cylinder 1 is connected with an end of the second snow throwing cylinder 2. The snow throwing driving device is arranged between the end of the first snow throwing cylinder 1 and the snow feeding assembly, the first rotary driving device 3 is connected with the first snow throwing cylinder 1, and the second rotary driving device 4 is connected with the second snow throwing cylinder 2. The snow throwing driving device is configured to drive the snow collected by the snow feeding assembly to be pushed into the first snow throwing cylinder 1 and drive the snow to be threw out of the other end of the second snow throwing cylinder 2.

The operation of acquiring, based on the GPS-RTK localization technology, the first relative position information between the grid where the snow removal robot is currently located and the actual snow throwing grid, includes operations as follows.

At S4911, based on the GPS-RTK localization technology, coordinates of a first central point of the grid where the snow removal robot is currently located, coordinates of a second central point of the actual snow throwing grid are acquired; a horizontal connecting segment between the coordinates of the first central point and the coordinates of the second central point is taken as a regulation reference segment, and a length of the regulation reference segment is acquired.

At S4912, the first rotary driving device 3 drives the first snow throwing cylinder 1 to rotate, so that a horizontal included angle between the regulation reference segment and an orientation of the other end of the second snow throwing cylinder 2 in a horizontal plane is less than a first preset angle.

At S4913, a snow throwing inclination is calculated based on the length of the regulation reference segment, and the second rotary driving device 4 drives the second snow throwing cylinder 2 to rotate, so that a vertical included angle between the regulation reference segment and an orientation of the other end of the second snow throwing cylinder 2 in a vertical plane is equal to the snow throwing inclination.

Figure 16:
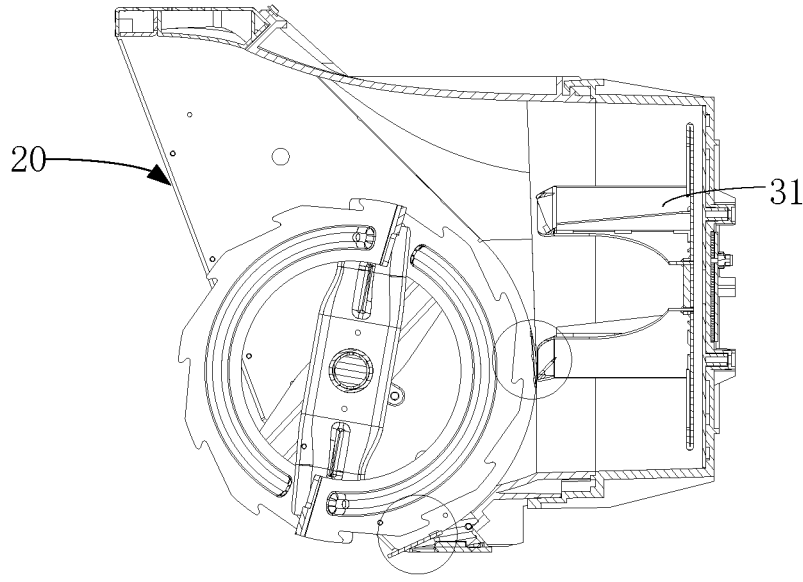
FIG. 16 is a second schematic structural diagram of the snow removal robot.

The snow throwing driving device may be in a blade structure driven by a motor. The motor drives blades to continuously rotate, the blades may load the snow pushed by the snow feeding assembly and continuously deliver the snow to the first snow throwing cylinder 1 and the second snow throwing cylinder 2 above the blades, and the snow is thrown out of an opening at an upper end of the second snow throwing cylinder 2. Since the opening at the upper end of the second snow throwing cylinder 2 has a particular inclination angle with respect to a lower end of the second snow throwing cylinder 2, the trajectory of the thrown snow likes a parabola. FIG. 16 illustrates an example of the snow throwing driving device 31. It is notable that FIG. 16 is only an example, and is not intend to be limiting.

After relative angle and position between the actual snow throwing grid and the grid where the snow removal robot is currently located are acquired based on the GPS-RTK localization technology, the first rotary driving device 3 may be controlled, based on a preset program, to drive the first snow throwing cylinder 1 to rotate in a horizontal plane (the second snow throwing cylinder 2 also rotates along with the first snow throwing cylinder 1), which enables the opening at the upper end of the second snow throwing cylinder 2 to point to the actual snow throwing grid in a horizontal direction. As such, a horizontal snow throwing angle of the second snow throwing cylinder 2 is adjusted. It can be understood that, under the setting of the first preset angle, the horizontal snow throwing angle of the second snow throwing cylinder 2 may be allowed to have a certain error. Specifically, the first preset angle may be set as 5°. When a horizontal included angle between the regulation reference segment and the orientation of the opening of the upper end of the second snow throwing cylinder 2 in the horizontal plane is in a range of ±5°, it may be considered that the horizontal snow throwing angle of the second snow throwing cylinder 2 has been adjusted properly.

After a straight-line distance between the grid where the snow removal robot is currently located and the actual snow throwing grid (i.e., a length of the regulation reference segment) is acquired based on the GPS-RTK localization technology, a theoretical snow throwing inclination of the second snow throwing cylinder 2 may be calculated, based on combination of the straight-line distance and parameters such as a throwing speed of the snow. The second rotary driving device 4 is controlled, based on the preset program, to drive the second snow throwing cylinder 2 to rotate on a vertical plane, so that the included angle between the horizontal plane and the opening of the upper end of the second snow throwing cylinder 2 is equal to the calculated snow throwing inclination. As such, a vertical snow throwing angle of the second snow throwing cylinder 2 is adjusted.

Through the above operations, the snow throwing angle can be adjusted in real time based on different snow throwing areas.

Figure 17:
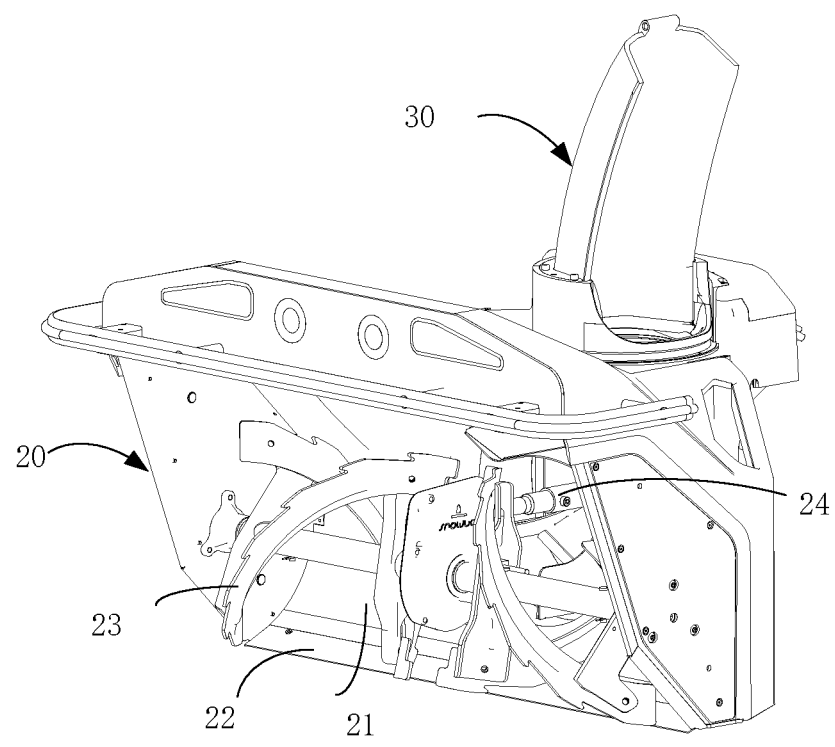
FIG. 17 is a third schematic structural diagram of the snow removal robot.

Furthermore, in some exemplary embodiments, as illustrated in FIG. 17, the snow feeding assembly 20 includes a snow feeding channel 21, a snow shovel 22, a snow feeding driving device 23, an elevating mechanism 24, an image sensing device, and an image processing module. It is notable that FIG. 17 is only an example, and is not intend to be limiting. The snow feeding channel is connected with the snow throwing assembly. The elevating mechanism is connected with the snow feeding channel. The snow shovel is provided at a snow inlet of the snow feeding channel. The snow feeding driving device is connected with the snow shovel. The image sensing device is provided in the snow feeding channel, and the image processing module is electrically connected with the image sensing device and the elevating mechanism.

The operation of performing the snow removal operation on an arrived grid, includes operations as follows.

At S5, the snow feeding driving device drives the snow shovel to cut external snow, and drive the cut external snow to be fed into the snow feeding channel continuously.

At S6, the image sensing device acquires an image of the fed snow in the snow feeding channel, and transmits the image to the image processing module.

At S7, the image processing module determines whether a proportion of the snow in the image exceeds a first preset proportion threshold, and determines whether the proportion of the snow in the image is less than a second preset proportion threshold, where the first preset proportion threshold is greater than the second preset proportion threshold.

At S8, when the proportion exceeds the first preset proportion threshold, the elevating mechanism drives the snow feeding channel to go up.

At S9, when the proportion is less than the second preset proportion threshold, the elevating mechanism drives the snow feeding channel to go down.

Through the above operations, the height of the snow feeding channel can be automatically adjusted based on an amount of snow fed into the snow feeding channel. The proportion refers to a ratio of an area occupied by the snow in the image to an area of the entire image. Specifically, the first preset proportion threshold is set as 80%, and the second preset proportion threshold is set as 20%. When the calculated proportion of the snow in the image of fed snow exceeds 80%, it indicates that the current amount of the snow fed into the snow feeding channel is relatively large and the snow feeding channel has a relatively low height, and the height of the snow feeding channel is required to be properly increased. When the calculated proportion of the snow in the image of fed snow is less than 20%, it indicates that the current amount of the snow fed into the snow feeding channel is relatively small and the snow feeding channel has a relatively high height, and the height of the snow feeding channel is required to be properly decreased.

Furthermore, in some exemplary embodiments, the snow inlet is provided with an infrared sensing device, and the infrared sensing device is electrically connected with the snow feeding driving device.

After the operation of driving, by the snow feeding driving device, the snow shovel to cut external snow, and driving the cut external snow to be fed into the snow feeding channel continuously, the method further includes operations as follows.

S51, the infrared sensing device acquires a temperature signal at the snow inlet.

At S52, in response to a fluctuation value of the temperature signal exceeding a preset temperature threshold, the snow feeding driving device is controlled to stop working.

Considering that a temperature of a living body is significantly higher than a temperature of the snow, the infrared sensing device is configured to detect the snow inlet in the illustrated embodiments. When the temperature signal acquired by the infrared sensing device fluctuates greatly, it indicates that a user's body part or a small animal is located at the snow inlet and may be probably involved in the snow feeding channel. At this time, the snow feeding driving device may be controlled, based on the preset program, to stop working in time (for example, the driving motor is turned off to stop the rotation of the snow shovel), so as to prevent unnecessary danger, thus improving the safety performance of the snow removal robot.

Furthermore, in some exemplary embodiments, the snow shovel is made of rubber.

Adopting a rubber material for the snow shovel is conductive to increase of tolerance and permeability of the snow shovel, which enables the snow shovel to be adapted to different road conditions, and enables improvement of a safety factor of the snow shovel during the process of cutting the snow and ice.

Figure 18:
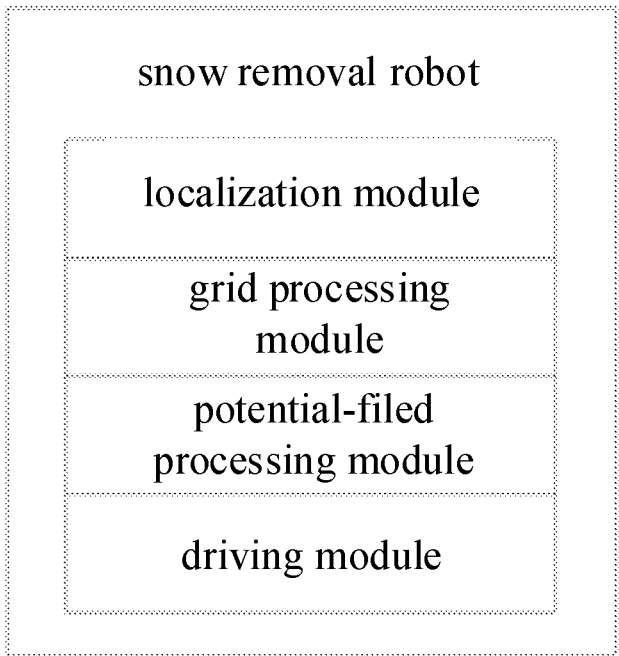
FIG. 18 is a schematic structural diagram of the snow removal robot of the disclosure.

As illustrated in FIG. 18, the embodiments of the disclosure further provide a snow removal robot, and the snow removal robot implements the above smart snow removal method. The snow removal robot includes:

a localization module, configured to generate the snow removal map by acquiring, based on the GPS-RTK localization technology, the latitude and longitude coordinates of the target snow throwing area, and the latitude and longitude coordinates of the target snow removal area;

a grid processing module, configured to perform the grid processing on the snow removal map;

a potential-filed processing module, configured to take the grid located in the target snow throwing area as the starting point, and assign, based on the breadth-first search algorithm, to the grids located in the target snow removal area the potential energy values in a manner of spreading outward; and a driving module, configured to control the snow removal robot to travel, grid by grid, from the uncleared grid whose potential energy value is currently the largest, and perform the snow removal operation on the arrived grid.

Since the snow removal robot adopts all the technical solutions of all the embodiments of the above smart snow removal method, the snow removal robot has at least all the beneficial effects brought about by the technical solutions of the above embodiments, which will not be repeated herein.

The embodiments of the disclosure further provide a smart snow removal equipment, which includes a controller and a memory. The memory is configured to store at least one instruction or at least one program which, when being loaded and executed by the controller, causes the above smart snow removal method to be implemented.

Since the snow removal equipment adopts all the technical solutions of all the embodiments of the above smart snow removal method, the snow removal equipment has at least all the beneficial effects brought about by the technical solutions of the above embodiments, which will not be repeated herein.

The embodiments of the disclosure further provide a non-transitory computer-readable storage medium storing a computer program thereon, the computer program, when being executed by one or more processors, causes operations of the above smart snow removal method to be implemented.

It is notable that when there is a directional indication, such as up, down, left, right, front, and rear, involved in the illustrated embodiments of the disclosure, the directional indication is only used to explain a relative position relationship, movement, etc., between various parts with respect to a particular posture. When the particular posture is changed, the directional indication also changes accordingly.

In addition, if there is a description of "first", "second" and the like in the embodiments of the disclosure, the description of "first", "second" and the like is only for the purpose of description, and cannot be understood as indicating or implying relative importance or implicitly indicating the number of indicated technical features. Therefore, the features defined by "first" and "second" may explicitly or implicitly include at least one of the features. In addition, the meaning of "and/or" in the full text includes three parallel schemes. Taking "A and/or B" as an example, it includes scheme A, or scheme B, or both schemes A and B. In addition, the technical solutions of the various embodiments can be combined with each other, but must be based on the realization by those skilled in the art. When the combination of the technical solutions is contradictory or infeasible, it shall be considered that the combination of the technical solutions does not exist and is not within the scope of protection of the disclosure.

It is also to be understood that the embodiments described above may be appropriately modified and varied by those skilled in the art in light of the disclosure and teachings from the description above. Therefore, the present application is not limited to the specific embodiments as disclosed and described above, and modifications and variations of the disclosure should fall within the scope of protection defined by the claims of the disclosure. In addition, although some specific terms have been used in the specification, these terms are merely used for ease of description, but do not constitute any limitation to the disclosure.

What is claimed is:

1. A smart snow removal method, implemented by a snow removal robot, comprising:

generating a snow removal map by acquiring, based on GPS-RTK localization technology, latitude and longitude coordinates of a target snow throwing area, and latitude and longitude coordinates of a target snow removal area, wherein there is a common boundary between the target snow throwing area and the target snow removal area;

performing grid processing on the snow removal map;

performing potential-field processing on the snow removal map obtained through the grid processing, comprising: taking a grid located in the target snow throwing area as a starting point, and assigning, based on a breadth-first search algorithm, to grids located in the target snow removal area potential energy values in a manner of spreading outward, wherein the potential energy values increase with the number of spread layers; and controlling the snow removal robot to travel, grid by grid, from an uncleared grid whose potential energy value is currently the largest, and performing a snow removal operation on an arrived grid, until the snow removal robot travels to the target snow throwing area.

2. The method as claimed in claim 1, wherein after the performing grid processing on the snow removal map, the method further comprises:

for each of the grids obtained through the grid processing, taking connecting lines respectively between a central point of the grid and individual vertices of the target snow removal area as first auxiliary lines;

in response to a sum of included angles between adjacent ones of all the first auxiliary lines being equal to 360°, determining that the grid is located in the target snow removal area; and setting each grid located in the target snow removal area as a snow removal grid, and setting each grid located in the target snow throwing area as a snow throwing grid; and wherein the taking a grid located in the target snow throwing area as a starting point, assigning, based on a breadth-first search algorithm, to grids located in the target snow removal area potential energy values in a manner of spreading outward, comprises:

taking the snow throwing grid as the starting point, and assigning, based on the breadth-first search algorithm, the potential energy values to all the snow removal grids in the manner of spreading outward.

3. The method as claimed in claim 2, wherein the generating a snow removal map by acquiring, based on GPS-RTK localization technology, latitude and longitude coordinates of a target snow throwing area, and latitude and longitude coordinates of a target snow removal area, comprises:

generating a snow removal map by acquiring, based on the GPS-RTK localization technology, the latitude and longitude coordinates of the target snow throwing area, the latitude and longitude coordinates of the target snow removal area, and latitude and longitude coordinates of a static obstacle area;

wherein after the performing grid processing on the snow removal map, the method further comprises:

for each of the grids, taking connecting lines respectively between each grid vertex of the grid and individual vertices of the static obstacle area as second auxiliary lines;

in response to a sum of included angles between adjacent ones of all the second auxiliary lines corresponding to any grid vertex of a grid is equal to 360°, determining that this grid overlaps with the static obstacle area; and setting each grid overlapping with the static obstacle area as a static obstacle grid; and wherein before the taking the snow throwing grid as the starting point, and assigning, based on the breadth-first search algorithm, the potential energy values to the snow removal grids in the manner of spreading outward, the method further comprises:

in response to the snow removal grids comprising the static obstacle grid, excluding the static obstacle grid from the snow removal grids.

4. The method as claimed in claim 3, wherein the method further comprises:

determining that the sum of the included angles between the adjacent ones of all the second auxiliary lines corresponding to the grid vertex of the grid is equal to 360°, in response to the grid vertex of the grid satisfying the following formula:

$$\sum_{i\in P, j=i+1(next)} \sin^{-1}\left(\frac{\overrightarrow{DP_i} \times \overrightarrow{DP_j}}{|\overrightarrow{DP_i}| * |\overrightarrow{DP_j}|}\right) = 2k\pi(k \in Z)$$

where D represents coordinates of the grid vertex of the grid, $P_i$ and $P_j$ represent coordinates of two adjacent vertices of the static obstacle area, superscripts of $\overrightarrow{DP_i}$ and $\overrightarrow{DP_j}$ represent vector symbols, and Z represents a set of integers.

5. The method as claimed in claim 2, wherein the method further comprises:

determining that the sum of the included angles between adjacent ones of all the first auxiliary lines is equal to 360°, in response to the central point satisfying the following formula:

$$\sum_{i\in P, j=i+1(next)} \sin^{-1}\left(\frac{\overrightarrow{OP_i} \times \overrightarrow{OP_j}}{|\overrightarrow{OP_i}| * |\overrightarrow{OP_j}|}\right) = 2k\pi(k \in Z)$$

where O represents coordinates of the central point, $P_i$ and $P_j$ represent coordinates of two adjacent vertices of the target snow removal area, superscripts of $\overrightarrow{OP_i}$ and $\overrightarrow{OP_j}$ represent vector symbols, and Z represents a set of integers.

6. The method as claimed in claim 2, wherein the controlling the snow removal robot to travel, grid by grid, from an uncleared grid whose potential energy value is currently the largest, and performing a snow removal operation on an arrived grid, comprises:

in response to the snow removal robot completing the snow removal operation on a snow removal grid where the snow removal robot is currently located, searching, in a preset range with the snow removal robot as a center, for a first target snow removal grid whose potential energy value is greater than or equal to a potential energy value of a grid where the snow removal robot is currently located, wherein the first target snow removal grid is in an uncleared state;

in response to searching out, in the preset range, at least one first target snow removal grid whose potential energy value is greater than or equal to the potential energy value of the grid where the snow removal robot is currently located, controlling the snow removal robot to travel, along the snow removal grids, to a nearest first target snow removal grid, and performing the snow removal operation on the first target snow removal grid;

in response to searching out, in the preset range, no first target snow removal grid whose potential energy value is greater than or equal to the potential energy value of the grid where the snow removal robot is currently located, searching, in the preset range with the snow removal robot as the center, for a second target snow removal grid whose potential energy value is less than the potential energy value of the grid where the snow removal robot is currently located, wherein the second target snow removal grid is in the uncleared state; and in response to searching out, in the preset range, at least one second target snow removal grid whose potential energy value is less than the potential energy value of the grid where the snow removal robot is currently located, controlling the snow removal robot to travel, along the snow removal grids, to a nearest second target snow removal grid, and performing the snow removal operation on the second target snow removal grid.

7. The method as claimed in claim 6, wherein after the searching, in the preset range with the snow removal robot as the center, for a second target snow removal grid whose potential energy value is less than the potential energy value of the grid where the snow removal robot is currently located, the method further comprises:

in response to searching out, in the preset range, no second target snow removal grid whose potential energy value is less than the potential energy value of the grid where the snow removal robot is currently located, searching for the snow throwing grid in the preset range with the snow removal robot as the center;

in response to searching out the snow throwing grid in the preset range, searching for a third target snow removal grid that is uncleared in the snow removal map;

in response to searching out at least one third target snow removal grid in the snow removal map, controlling the snow removal robot to travel, along the snow removal grids, to a third target snow removal grid whose potential energy value is currently the largest, and performing the snow removal operation on the third target snow removal grid; and in response to the snow removal robot completing the snow removal operation on the third target snow removal grid, proceeding to the operation of searching, in a preset range with the snow removal robot as a center, for a first target snow removal grid whose potential energy value is greater than or equal to the potential energy value of the grid where the snow removal robot is currently located.

8. The method as claimed in claim 6, wherein the snow removal robot comprises:

a traveling assembly, configured to travel along a planned path;

a snow feeding assembly provided on the traveling assembly, wherein the snow feeding assembly is configured to collect snow during a snow removal operation; and a snow throwing assembly provided on the traveling assembly and connected with the snow feeding assembly, wherein the snow throwing assembly is configured to throw the snow collected by the snow feeding assembly to a predetermined area during the snow removal operation.

9. The method as claimed in claim 8, wherein the performing the snow removal operation on an arrived grid, comprises:

collecting snow by the snow feeding assembly;

determining whether there is a snow throwing grid in a preset range;

in response to no snow throwing grid being in the preset range, taking, as an actual snow throwing grid, an uncleared snow removal grid whose potential energy value is the lowest in the preset range;

in response to a snow throwing grid being in the preset range, taking the snow throwing grid as the actual snow throwing grid; and orienting a snow throwing direction of the snow throwing assembly toward the actual snow throwing grid.

10. The method as claimed in claim 9, wherein the orienting a snow throwing direction of the snow throwing assembly toward the actual snow throwing grid, comprises:

acquiring, based on the GPS-RTK localization technology, first relative position information between the grid where the snow removal robot is currently located and the actual snow throwing grid; and adjusting, based on the first relative position information, a snow throwing angle of the snow throwing assembly.

11. The method as claimed in claim 10, wherein the snow throwing assembly comprises a snow throwing driving device, a first rotary driving device, a second rotary driving device, a first snow throwing cylinder, and a second snow throwing cylinder; the first snow throwing cylinder is rotatably connected with the traveling assembly along a vertical axis, and the second snow throwing cylinder is rotatably connected with the first snow throwing cylinder along a horizontal axis; an end of the first snow throwing cylinder is connected with the snow feeding assembly, and the other end of the first snow throwing cylinder is connected with an end of the second snow throwing cylinder; the snow throwing driving device is arranged between the end of the first snow throwing cylinder and the snow feeding assembly, the first rotary driving device is connected with the first snow throwing cylinder, and the second rotary driving device is connected with the second snow throwing cylinder; and the snow throwing driving device is configured to drive the snow collected by the snow feeding assembly to be pushed into the first snow throwing cylinder and drive the snow to be threw out of the other end of the second snow throwing cylinder;

wherein the acquiring, based on the GPS-RTK localization technology, first relative position information between the grid where the snow removal robot is currently located and the actual snow throwing grid, comprises:

acquiring, based on the GPS-RTK localization technology, coordinates of a first central point of the grid where the snow removal robot is currently located, coordinates of a second central point of the actual snow throwing grid, taking, as a regulation reference segment, a horizontal connecting segment between the coordinates of the first central point and the coordinates of the second central point, and acquiring a length of the regulation reference segment;

driving, by the first rotary driving device, the first snow throwing cylinder to rotate, so that a horizontal included angle between the regulation reference segment and an orientation of the other end of the second snow throwing cylinder in a horizontal plane is less than a first preset angle;

calculating, based on the length of the regulation reference segment, a snow throwing inclination, and driving, by the second rotary driving device, the second snow throwing cylinder to rotate, so that a vertical included angle between the regulation reference segment and an orientation of the other end of the second snow throwing cylinder in a vertical plane is equal to the snow throwing inclination.

12. The method as claimed in claim 8, further comprising: setting a mark indicating the uncleared state, on each snow throwing grid and each snow removal gird for which the snow removal robot has not performed the snow removal operation; and setting a mark indicating a cleared stated, on each snow removal grid for which the snow removal robot has been performed the snow removal operation.

13. The method as claimed in claim 8, wherein the traveling assembly is provided with a millimeter-wave radar sensing device;

wherein the controlling the snow removal robot to travel, along the snow removal grids, to a nearest first target snow removal grid, and performing the snow removal operation on the first target snow removal grid, comprises:

performing, by the millimeter-wave radar sensing device, a dynamic obstacle detection on a travelling path, while the snow removal robot travels toward the nearest first target snow removal grid;

in response to the millimeter-wave radar sensing device detecting a dynamic obstacle in front of the snow removal robot, controlling the snow removal robot to stop traveling;

acquiring information on the dynamic obstacle by the millimeter-wave radar sensing device, and marking, as a dynamic obstacle grid, a grid overlapping with the dynamic obstacle; and excluding the dynamic obstacle grid from the snow removal grids, and proceeding to the operation of searching, in a preset range with the snow removal robot as a center, for a first target snow removal grid whose potential energy value is greater than or equal to the potential energy value of the grid where the snow removal robot is currently located.

14. The method as claimed in claim 8, wherein the traveling assembly is provided with a millimeter-wave radar sensing device;

wherein the controlling the snow removal robot to travel, along the snow removal grids, to a nearest second target snow removal grid, and performing the snow removal operation on the second target snow removal grid, comprises:

performing, by the millimeter-wave radar sensing device, a dynamic obstacle detection on a travelling path, while the snow removal robot travels toward the nearest second target snow removal grid;

in response to the millimeter-wave radar sensing device detecting a dynamic obstacle in front of the snow removal robot, controlling the snow removal robot to stop traveling;

acquiring information on the dynamic obstacle by the millimeter-wave radar sensing device, and marking, as a dynamic obstacle grid, a grid overlapping with the dynamic obstacle; and excluding the dynamic obstacle grid from the snow removal grids, and proceeding to the operation of searching, in the preset range with the snow removal robot as the center, for a second target snow removal grid whose potential energy value is less than the potential energy value of the grid where the snow removal robot is currently located.

15. The method as claimed in claim 1, wherein the snow removal robot comprises:

a traveling assembly, configured to travel along a planned path;

a snow feeding assembly provided on the traveling assembly, wherein the snow feeding assembly is configured to collect snow during a snow removal operation; and a snow throwing assembly provided on the traveling assembly and connected with the snow feeding assembly, wherein the snow throwing assembly is configured to throw the snow collected by the snow feeding assembly to a predetermined area during the snow removal operation;

wherein the snow feeding assembly comprises a snow feeding channel, a snow shovel, a snow feeding driving device, an elevating mechanism, an image sensing device, and an image processing module, the snow feeding channel is connected with the snow throwing assembly, the elevating mechanism is connected with the snow feeding channel, the snow shovel is provided at a snow inlet of the snow feeding channel, the snow feeding driving device is connected with the snow shovel, the image sensing device is provided in the snow feeding channel, and the image processing module is electrically connected with the image sensing device and the elevating mechanism; and wherein the performing the snow removal operation on an arrived grid, comprises:

driving, by the snow feeding driving device, the snow shovel to cut external snow, and driving the cut external snow to be fed into the snow feeding channel continuously;

acquiring, by the image sensing device, an image of the fed snow in the snow feeding channel, and transmitting the image to the image processing module;

determining, by the image processing module, whether a proportion of the snow in the image exceeds a first preset proportion threshold, and determining, by the image processing module, whether the proportion of the snow in the image is less than a second preset proportion threshold, wherein the first preset proportion threshold is greater than the second preset proportion threshold;

in response to the proportion exceeding the first preset proportion threshold, driving, by the elevating mechanism, the snow feeding channel to go up; and in response to the proportion being less than the second preset proportion threshold, driving, by the elevating mechanism, the snow feeding channel to go down.

16. The method as claimed in claim 15, wherein the snow inlet is provided with an infrared sensing device, and the infrared sensing device is electrically connected with the snow feeding driving device;

wherein after the driving, by the snow feeding driving device, the snow shovel to cut external snow, and driving the cut external snow to be fed into the snow feeding channel continuously, the method further comprises:

acquiring, by the infrared sensing device, a temperature signal at the snow inlet; and in response to a fluctuation value of the temperature signal exceeding a preset temperature threshold, controlling the snow feeding driving device to stop working.

17. The method as claimed in claim 15, wherein the snow shovel is made of rubber.

18. A snow removal robot, comprising:

a traveling assembly, configured to travel along a planned path, wherein the planned path is determined by:

generating a snow removal map by acquiring, based on GPS-RTK localization technology, latitude and longitude coordinates of a target snow throwing area, and latitude and longitude coordinates of a target snow removal area, wherein there is a common boundary between the target snow throwing area and the target snow removal area;

obtaining girds of the snow removal map by performing grid processing on the snow removal map;

taking a grid located in the target snow throwing area as a starting point, and assigning, based on a breadth-first search algorithm, to grids located in the target snow removal area potential energy values in a manner of spreading outward, wherein the potential energy values increase with the number of spread layers; and determining, based on the potential energy values of the grids located in the target snow removal area, a planned path for travelling grid by grid;

a snow feeding assembly provided on the traveling assembly, wherein the snow feeding assembly is configured to collect snow on each arrived grid during a snow removal operation; and a snow throwing assembly provided on the traveling assembly and connected with the snow feeding assembly, wherein the snow throwing assembly is configured to throw the snow collected by the snow feeding assembly to a predetermined area during the snow removal operation.

19. The snow removal robot as claimed in claim 18, wherein the snow throwing assembly comprises a snow throwing driving device, a first rotary driving device, a second rotary driving device, a first snow throwing cylinder, and a second snow throwing cylinder; the first snow throwing cylinder is rotatably connected with the traveling assembly along a vertical axis, and the second snow throwing cylinder is rotatably connected with the first snow throwing cylinder along a horizontal axis; an end of the first snow throwing cylinder is connected with the snow feeding assembly, and the other end of the first snow throwing cylinder is connected with an end of the second snow throwing cylinder; the snow throwing driving device is arranged between the end of the first snow throwing cylinder and the snow feeding assembly, the first rotary driving device is connected with the first snow throwing cylinder, and the second rotary driving device is connected with the second snow throwing cylinder; and the snow throwing driving device is configured to drive the snow collected by the snow feeding assembly to be pushed into the first snow throwing cylinder and drive the snow to be threw out of the other end of the second snow throwing cylinder.

20. A smart snow removal equipment, comprising:

a memory, configured to store at least one instruction or at least one program;

a controller connected with the memory, wherein the controller is configured to perform the at least one instruction or at least one program to:

generate, based on GPS-RTK localization technology, a snow removal map of a target snow throwing area and a target snow removal area which have a common boundary;

obtain, based on grid processing, grids of the snow removal map;

take a grid located in the target snow throwing area as a starting point, and assign, based on a breadth-first search algorithm, to grids located in the target snow removal area potential energy values in a manner of spreading outward, wherein the potential energy values increase with the number of spread layers; and determine, based on the potential energy values of the grids located in the target snow removal area, a planned path for travelling grid by grid;

a traveling assembly connected with the controller, wherein the traveling assembly is configured to travel, grid by grid, along the planned path from an uncleared grid whose potential energy value is currently the largest, until the traveling assembly travels to the target snow throwing area; and a snow removal assembly connected with the controller and the travelling assembly, wherein the snow removal assembly is configured to perform, under control of the controller, a snow removal operation on each grid where the traveling assembly arrives.

* * * * *